(12) United States Patent
Ketcham et al.

(10) Patent No.: US 9,199,868 B2
(45) Date of Patent: Dec. 1, 2015

(54) HIGH STATIC FATIGUE ALUMINA ISOPIPES

(75) Inventors: Thomas D. Ketcham, Horseheads, NY (US); Joseph J. McIntosh, Painted Post, NY (US); Steven M. Milillo, State College, PA (US); Eunyoung Park, Elmira, NY (US)

(73) Assignee: Corning Incorporated, Corning, NY (US)

( * ) Notice: Subject to any disclaimer, the term of this patent is extended or adjusted under 35 U.S.C. 154(b) by 20 days.

(21) Appl. No.: 13/180,052

(22) Filed: Jul. 11, 2011

(65) Prior Publication Data

US 2012/0180528 A1 Jul. 19, 2012

Related U.S. Application Data

(60) Provisional application No. 61/363,445, filed on Jul. 12, 2010.

(51) Int. Cl.
   *C03B 17/06* (2006.01)
   *C04B 35/10* (2006.01)

(52) U.S. Cl.
   CPC ............. *C03B 17/064* (2013.01); *C04B 35/10* (2013.01)

(58) Field of Classification Search
   CPC .................................................. C03B 17/064
   USPC .......................................................... 65/374.13
   See application file for complete search history.

(56) References Cited

U.S. PATENT DOCUMENTS

| | | | |
|---|---|---|---|
| 3,026,210 A | 3/1962 | Coble | |
| 3,338,696 A | 8/1967 | Dockerty | |
| 3,437,470 A | 4/1969 | Overman | |
| 3,505,158 A * | 4/1970 | Murray | 428/137 |
| 3,652,307 A * | 3/1972 | Bakker | 501/128 |
| 3,682,609 A | 8/1972 | Dockerty | |
| 3,879,210 A * | 4/1975 | LaBar | 501/128 |
| 4,018,965 A | 4/1977 | Kerko et al. | |

(Continued)

FOREIGN PATENT DOCUMENTS

| CN | 1244513 A | 2/2000 |
|---|---|---|
| CN | 101163645 A | 4/2008 |

(Continued)

OTHER PUBLICATIONS

Kingery et al. "Introduction to Ceramics" (1976) p. 10, John Wiley & Sons.*

(Continued)

*Primary Examiner* — John Hoffmann
(74) *Attorney, Agent, or Firm* — Thomas R. Beall; Ryan T. Hardee

(57) ABSTRACT

Isopipes (13) for making a glass or a glass-ceramic using a fusion process are provided. The isopipes are made from an alumina material which has a higher static fatigue than existing alumina materials intended for use as isopipes. In particular, the alumina materials have times-to-failure (static fatigues) of greater than one hour at 1200° C. at an applied stress of 10,000 psi. These high levels of static fatigue allow alumina isopipes to replace zircon isopipes in the manufacture of high performance glass sheets by the fusion process, including glass sheets which are incompatible with zircon isopipes but compatible with alumina isopipes, e.g., chip and scratch resistant glass sheets which have high alkali contents.

29 Claims, 19 Drawing Sheets

(56) References Cited

U.S. PATENT DOCUMENTS

| | | | |
|---|---|---|---|
| 4,148,661 | A | 4/1979 | Kerko et al. |
| 4,568,652 | A * | 2/1986 | Petty, Jr. .................. 501/127 |
| 5,116,789 | A * | 5/1992 | Dumbaugh et al. ............ 501/66 |
| 5,296,420 | A * | 3/1994 | Garvie ..................... 501/105 |
| 6,159,885 | A | 12/2000 | Mizuno et al. |
| 6,814,917 | B1 | 11/2004 | Watanabe et al. |
| 6,974,786 | B2 | 12/2005 | Helfinstine et al. |
| 7,534,734 | B2 | 5/2009 | Ellison |
| 7,666,511 | B2 | 2/2010 | Ellison et al. |
| 7,829,745 | B1 | 11/2010 | Horn |
| 7,851,394 | B2 | 12/2010 | Ellison |
| 8,490,432 | B2 | 7/2013 | Berkey et al. |
| 2003/0121287 | A1 | 7/2003 | Chalk et al. |
| 2006/0236722 | A1 | 10/2006 | Delia et al. |
| 2007/0068197 | A1 | 3/2007 | Pitbladdo |
| 2008/0057275 | A1 | 3/2008 | Grzesik et al. |
| 2008/0131651 | A1 | 6/2008 | Burdette et al. |
| 2009/0111679 | A1 | 4/2009 | Lu |
| 2009/0215607 | A1 | 8/2009 | Dejneka et al. |
| 2010/0084016 | A1 | 4/2010 | Aitken et al. |
| 2010/0087307 | A1 | 4/2010 | Murata et al. |
| 2010/0251774 | A1 | 10/2010 | Peterson |
| 2011/0045961 | A1 | 2/2011 | Dejneka et al. |
| 2012/0006059 | A1 | 1/2012 | Dejneka et al. |

FOREIGN PATENT DOCUMENTS

| | | |
|---|---|---|
| CN | 101277799 A | 10/2008 |
| EP | 0 850 897 A1 | 7/1998 |
| GB | 1 072 536 A | 6/1967 |
| JP | 11-246230 | 9/1999 |
| JP | 2007-197303 A | 8/2007 |
| WO | WO2006/073841 | 7/2006 |
| WO | WO2009/070263 | 6/2009 |

OTHER PUBLICATIONS

Ceralox Spray Dried Ceramic Aluminas (Mar. 2004) pp. 1-2, Sasol data sheet.*

Choi et al., "Static Fatigue in ceramic materials: influences of an intergranular glassy phase and fracture toughness," Journal of Materials Science, 28 (1993) 5931-5936.

Lin et al. "Static and Cyclic Fatigue of Alumina at High Temperatures," J. Am. Ceram. Soc., (1991) 74:1511-1518.

Lin et al. "Static and Cyclic Fatigue of Alumina at High Temperatures: II, Failure Analysis," J. Am. Ceram. Soc., (1992) 75:637-648.

Park et al., "Static and cyclic fatigue behaviour in alumina ceramics" Journal of Materials Science Letters 14 (1995) 1688-1690.

Park et al., "Prediction of Static Fatigue Life of Ceramics", Journal of Materials Science Letters 16 (1997) 1352-1353.

Ritter et al., "Statistical Reproducibility of the Dynamic and Static Fatigue Experiments", Ceramic Bulletin, 60:8, (1981) 798-806.

Varshneya, Arun K., "Flat Glass," Fundamentals of Inorganic Glasses, Academic Press, Inc., Boston, 1994, Chapter 20, Section 4.2., 534-540.

Webb et al. "R-curve and subcritical crack growth behavior at elevated temperatures in coarse grain alumina," Acta Mater, 44:6, (1996) 2259-2264.

Wiederhorn et al., "Stress Corrosion and Static Fatigue of Glass", Journal of the American Ceramic Society, vol. 53, No. 10, 1970, pp. 543-548.

ASTM C336, 1971 (2010), "Annealing Point and Strain Point of Glass by Fiber Elongation," ASTM Int'l W. Conshohocken PA, 2010, pp. 1-5.

ASTM C598, 1993 (2008), "Annealing Point and Strain Point of Glass by Beam Bending," ASTM Int'l, W. Conshohocken PA, 2008, pp. 1-5.

ASTM C1211, 2002, "Flexural Strength of Advanced Ceramics at Elevated Temperatures," ASTM Int'l, W. Conshohocken PA, 2002, pp. 1-17.

ASTM C1291, 2000a (2010), "Elevated Temperature Tensile Creep Strain, Creep Strain Rate and Creep Time-to-Failure . . . ," ASTM Int'l, W. Conshohocken PA, 2010, pp. 1-15.

ASTM C1368, 2006, "Determination of Slow Crack Growth Parameters of Advanced Ceramics by Constant Stress-Rate Flexural . . . ," ASTM Int'l, W. Conshohocken PA, 2006, pp. 1-10.

ASTM C1465, 2008, "Determination of Slow Crack Growth Parameters of Advanced Ceramics by Constant Stress-Rate Flexural . . . ," ASTM Int'l, W. Conshohocken PA, 2008, pp. 1-15.

ASTM C1495, 2007, "Effect of Surface Grinding on Flexure Strength of Avanced Ceramics," ASTM Int'l, W. Conshohocken PA, 2007, pp. 1-12.

ASTM C1576, 2005 (2010), "Determination of Slow Crack Growth Parameters of Advanced Ceramics by Constant Stress . . . ," ASTM Int'l, W. Conshohocken PA, 2010, pp. 1-13.

Dejneka et al., U.S. Appl. No. 13/112,302 entitled "Alumina Isopipes for Use With Tin-Containing Glasses," Jun. 29, 2012 Office Action, PTOL-90A and pp. 1-5.

Dejneka et al., U.S. Appl. No. 13/112,302 entitled "Alumina Isopipes for Use With Tin-Containing Glasses," Nov. 9, 2012 Office Action, PTOL-90A and pp. 1-6.

Dejneka et al., U.S. Appl. No. 13/112,302 entitled "Alumina Isopipes for Use With Tin-Containing Glasses," May 9, 2013 Office Action, PTOL-90A and pp. 1-7.

Saint-Gobain Sefpro catalog page entitled "Sintered Materials—High Alumina A 1148," Saint-Gobain SEFPRO, Le Pontet, France, 2007, pp. 1-2.

Dejneka et al., U.S. Appl. No. 13/112,302 entitled "Alumina Isopipes for Use With Tin-Containing Glasses," Aug. 7, 2013 Office Action, PTOL-90A and pp. 1-2.

Dejneka et al., U.S. Appl. No. 13/112,302 entitled "Alumina Isopipes for Use With Tin-Containing Glasses," Jan. 30, 2014 Office Action, PTOL-90A and pp. 1-6.

Dejneka et al., U.S. Appl. No. 13/112,302 entitled "Alumina Isopipes for Use With Tin-Containing Glasses," Sep. 12, 2014 Office Action, PTOL-90A and pp. 1-7.

Dejneka et al., U.S. Appl. No. 13/112,302 entitled "Alumina Isopipes for Use With Tin-Containing Glasses," Jun. 5, 2015 Office Action (7 pages).

Dejneka et al., U.S. Appl. No. 13/112,302 entitled "Alumina Isopipes for Use With Tin-Containing Glasses," Dec. 12, 2014 Office Action, PTOL-90A and pp. 1-2.

Dejneka et al., U.S. Appl. No. 13/112,302 entitled "Alumina Isopipes for Use With Tin-Containing Glasses," Jan. 16, 2015 Office Communication (3 pages).

* cited by examiner

HIGH STATIC FATIGUE ALUMINA ISOPIPES

CROSS-REFERENCE TO RELATED APPLICATION

This application claims the benefit of priority under 35 U.S.C. §119 of U.S. Provisional Application Ser. No. 61/363,445 filed on Jul. 12, 2010, the contents of which in its entirety is hereby incorporated by reference.

FIELD

This disclosure relates to isopipes used in the production of sheet glass by the fusion process and, in particular, to alumina isopipes which exhibit high levels of static fatigue.

DEFINITIONS

The phrase "static fatigue" refers to the phenomenon of delayed fracture when a body is put under stress and does not fracture or fail immediately. In general terms, static fatigue lifetimes can be as low as a few seconds or minutes or as long as tens of thousands of hours.

The phrase "alumina material" refers to a refractory material which comprises one or more $Al_2O_3$ phases which in combination are at least 50 volume percent of the material.

The word "isopipe" refers generically to a body having a configuration suitable for use as a glass forming structure in a fusion downdraw process, irrespective of the particular shape and construction of the body or whether formation of the body involves isopressing or not.

When numerical ranges are set forth in the specification or claims, the ranges include their end points.

BACKGROUND

A. The Fusion Process

The fusion process is one of the basic techniques used in the glass making art to produce sheet glass. See, for example, Varshneya, Arun K., "Flat Glass," Fundamentals of Inorganic Glasses, Academic Press, Inc., Boston, 1994, Chapter 20, Section 4.2., 534-540. Compared to other processes known in the art, e.g., the float and slot draw processes, the fusion process produces glass sheets whose surfaces have superior flatness and smoothness. As a result, the fusion process has become of particular importance in the production of the glass sheets used in the manufacture of various electronic devices. As just two examples, fusion-produced glass sheets have been used as substrates in the production of flat panel display devices, e.g., liquid crystal displays (LCDs), and as faceplates, e.g., touch screens, in mobile electronic devices.

The fusion process, specifically, the overflow downdraw fusion process, is the subject of commonly-assigned U.S. Pat. Nos. 3,338,696 and 3,682,609, to Stuart M. Dockerty, the contents of which are incorporated herein by reference. A schematic drawing of the process of these patents is shown in FIG. 1. As illustrated therein, the system includes a supply pipe 9 which provides molten glass to a collection trough 11 formed in a free-space spanning, refractory body 13 known as an "isopipe."

Once steady state operation has been achieved, molten glass passes from the supply pipe to the trough and then overflows the weirs (i.e., the tops of the trough on both sides), thus forming two sheets of glass that flow downward and inward along the outer surfaces of the isopipe. The two sheets meet at the bottom or root 15 of the isopipe, where they fuse together into a single sheet, e.g., a sheet having a thickness of ~700 microns. The single sheet is then fed to drawing equipment (represented schematically by arrows 17 in FIG. 1), which controls the thickness of the sheet by the rate at which the sheet is drawn away from the root.

As can be seen in FIG. 1, the outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

B. Isopipe Requirements

As is evident from the foregoing, isopipe 13 is critical to the success of the fusion process as it makes direct contact with the glass during the forming process. Thus, the isopipe needs to fulfill strict mechanical and chemical requirements to have a lifetime that is not too short and to deliver a quality sheet glass product.

With regard to mechanical requirements, during use, a vertical temperature gradient is imposed on the isopipe to manage the viscosity of the molten glass being formed into the glass sheets. In particular, at the root of the isopipe, the glass viscosity typically needs to be in the range of approximately 100 to 300 kP, and to achieve this viscosity the vertical temperature gradient is, for example, on the order of 50-100° C. In addition to this steady-state temperature gradient, the isopipe must also be able to withstand transient gradients during heat-up, as well as during maintenance and repair operations, e.g., during replacement of one or more of the external heating elements used to maintain the pipe at its operating temperature.

In addition to the ability to withstand temperature gradients, an isopipe needs to have a substantially constant configuration at its use temperature. Dimensional stability is of great importance since changes in isopipe geometry affect the overall success of the fusion process. See, for example, Overman, U.S. Pat. No. 3,437,470, and Japanese Patent Publication No. 11-246230. Unfortunately, the conditions under which the isopipe is used make it susceptible to dimensional changes. Thus, the isopipe operates at elevated temperatures on the order of 1000° C. and above. Moreover, the isopipe operates at these elevated temperatures while supporting its own weight as well as the weight of the molten glass overflowing its sides and in trough 11, and at least some tensional force that is transferred back to the isopipe through the fused glass as it is being drawn.

Depending on the width of the glass sheets that are to be produced, the isopipe can have an unsupported length of two meters or more. Current business trends are towards ever larger glass sheets requiring ever larger isopipes for their formation. For an isopipe span on the order of 13 feet, the weight of an isopipe made from zircon (see below) is estimated to be in excess of 15,000 pounds. Moreover, analysis shows that the rate of isopipe sag due to creep (see below) is proportionate to its length raised to the fourth power and inversely proportionate to the square of its height. Accordingly, a doubling in the length of the isopipe (with the same life requirement and temperature capability) requires either a 16 fold decrease in intrinsic creep rate or a four fold increase in height.

In addition to the foregoing mechanical requirements, the isopipe has to meet stringent chemical requirements. In particular, the isopipe should not be rapidly attacked by or be the source of defects in the glass. In terms of commercial production, the defect levels in glass sheets produced by the fusion process have to be extremely low, e.g., on the order of 0.01 defects/pound and below. As the size of the glass sheets has increased, meeting these low defect levels has become ever more challenging, making the need for a chemically stable isopipe even more important.

C. Isopipe Materials

To withstand the above demanding conditions, isopipes 13 have been manufactured from isostatically pressed blocks of refractory material. In particular, isostatically-pressed zircon refractories, such as those sold by St. Gobain-SEFPRO of Louisville, Ky., have been used to form isopipes for the fusion process.

In recent years, efforts have been made to improve the mechanical properties of zircon isopipes. In particular, the creep properties of zircon isopipes have been the subject of intensive research. See, for example, commonly-assigned U.S. Pat. No. 6,974,786 to Helfinstine et al. and PCT Patent Publication No. WO 2006/073841 to Tanner et al., the contents of both of which are incorporated herein by reference.

As known in the art, creep is the permanent change in the physical shape of a refractory or other material as a result of an imparted stress usually at elevated temperature. The creep acts in such a way as to relieve the stress, and is usually attributed to grain boundary sliding or material diffusion. Zircon suffers from creep because at high temperature it decomposes to silica liquid and zirconia, and the presence of silica liquid at grain boundaries increases the creep rate.

An isopipe undergoing creep sags in the middle and deforms the weirs over which the glass flows. When the weirs are no longer straight, the glass flow distribution across the length of the isopipe is disturbed and it becomes more difficult and eventually impossible to manage glass sheet formation, thus ending production. Thus, even though zircon is considered to be a high performance refractory material, in practice, isopipes composed of commercially available zircon exhibit dimensional changes which limit their useful life.

It should be noted that while creep has been recognized as a critical property of isopipe materials, prior to the present disclosure, static fatigue has not been considered critical, either in connection with isopipes in general or zircon isopipes in particular.

As to chemical stability, zircon is known to dissolve into alkali-free glasses (e.g., LCD glasses) at the hotter regions near the weirs of the isopipe and then precipitate in the cooler regions near the root to form secondary zircon crystals. These crystals can be sheared off by the glass flow and become inclusions in the sheet. Secondary crystals incorporated into the drawn glass are visual defects, and finished LCD panels with such defects are rejected. As disclosed in commonly-assigned U.S. Patent Publication No. 2003/0121287, published July 3, 2003, the contents of which are incorporated herein by reference, secondary zircon precipitation can be controlled by restricting the weir-root temperature difference to less than about 100° C.

In accordance with the present disclosure, it has been discovered that although zircon isopipes can be used with some alkali-containing glasses, they are incompatible with others. In particular, as discussed more fully in Example 1 below, zircon can develop a blocky morphology and a surface layer composed of zirconia and having a "fish-egg" appearance when exposed to glasses having high levels of alkali (i.e., glasses wherein, on an oxide basis, the sum of $Na_2O$, $K_2O$, and $Li_2O$ is greater than or equal to 5 weight percent; hereinafter referred to as "high alkali glasses"; note that because the molecular weights of $Na_2O$ and $K_2O$ are substantially greater than that of $Li_2O$, high alkali glasses which primarily contain $Na_2O$ and/or $K_2O$ will tend to have higher alkali weight percents (e.g., greater than or equal to 10 weight percent) than those which primarily contain $Li_2O$ (e.g., greater than or equal to 5 weight percent)). The inability to use zircon isopipes with such glasses is a serious deficiency since the glasses are particularly useful in applications requiring chip and scratch resistant glass surfaces, e.g., touch screens, watch crystals, cover plates, solar concentrators, windows, screens, containers, and the like. See, for example, commonly-assigned U.S. Pat. No. 7,666,511, U.S. Patent Publication No. US 2009/0215607, and U.S. application Ser. No. 12/542,946, filed Aug. 18, 2009, the contents of all of which are incorporated herein by reference.

In addition to zircon, isopipes have also been made of alumina. See, for example, commonly-assigned U.S. Pat. No. 4,018,965, the contents of which are incorporated herein by reference. In particular, besides its zircon refractories, St. Gobain-SEFPRO of Louisville, Ky., has also sold alumina refractories for use as isopipes, specifically, its A1148 alumina refractory. At first blush, A1148 would appear to be a better material than zircon for use in isopipes since it has a lower creep rate, and in the early days of the fusion process, A1148 was the material of choice. In those days, the isopipes were typically composed of two pieces, i.e., a top portion containing the trough and a lower portion containing the sloping sides, and were generally shorter than modern isopipes. Also, the forming temperatures of the glasses being produced in the early days were lower than those used today, e.g., early applications of the fusion process involved glasses having forming temperatures around 1000° C. or less, e.g., 800-1000° C., while today's glasses are formed on fusion draws at temperatures as high as 1300° C., with 1200-1230° C. being typical. Under the conditions that prevailed in the past, A1148 performed successfully and was routinely used.

However, over time and, in particular, in connection with the growth in popularity of the fusion process as a preferred method for making alkali-free glass substrates for display applications, alumina was phased out and replaced with zircon. Today, most of the display substrates made by the fusion process are made with zircon isopipes. But, as discussed above and illustrated in Example 1 below, zircon isopipes are chemically-incompatible with the high alkali glasses which are becoming dominant in the personal (portable) electronics field.

Moreover, as discussed in detail below, in accordance with the present disclosure, it has been discovered that although historically A1148 alumina was usable as an isopipe material, under modern conditions, A1148 alumina is a poor material. Specifically, in accordance with present disclosure, it has been recognized that static fatigue is a critical parameter for a candidate isopipe material and, in accordance with that recognition, the static fatigue of A1148 alumina has been determined. That determination, in turn, has been used to calculate times-to-failure for A1148 under conditions representative of those encountered during the use of an isopipe. That analysis showed that A1148 will fail during use and, in particular, will fail under conditions that cannot be avoided, e.g., during maintenance and repair of the heating elements employed to heat an isopipe. Such a failure can literally cause the isopipe to break into parts thus endangering portions of a fusion machine lying below the isopipe, as well as personnel working in the vicinity of the machine.

A pressing need thus exists to provide isopipe materials suitable for use in the fusion process and, in particular, for use in the fusion process during the manufacture of high alkali glasses. The present disclosure addresses this need.

SUMMARY

According to a first aspect, an isopipe is disclosed which comprises a body having a configuration adapted for use in a fusion process (e.g., a fusion process for forming a glass or a glass-ceramic into sheets), said body comprising an alumina refractory which (i) comprises at least 90 volume percent of crystalline $Al_2O_3$ and (ii) has a static fatigue in terms of time-to-failure of at least one hour when tested at 1200° C. with an applied stress of 10,000 psi.

According to a second aspect, an isopipe is disclosed which comprises a body having a configuration adapted for use in a fusion process, said body comprising an alumina refractory which (i) comprises at least 90 volume percent of crystalline $Al_2O_3$, and (ii) comprises a glass phase, wherein the volume percent of the glass phase is less than or equal to one.

According to a third aspect, an isopipe is disclosed which comprises a body having a configuration adapted for use in a fusion process, said body comprising an alumina refractory which (i) comprises at least 90 volume percent of crystalline $Al_2O_3$, and (ii) comprises a glass phase, wherein the glass of the glass phase:
 (i) comprises alumina and silica and on an oxide basis, the alumina and the silica comprise at least 90 mole percent of the glass;
 (ii) on an oxide basis, the glass has an alkaline earth plus rare earth content that is greater than or equal to 2 mole percent; and
 (iii) on an oxide basis, the glass has an alkali content that is less than or equal to 5.5 mole percent.

According to a fourth aspect, an isopipe is disclosed which comprises a body having a configuration adapted for use in a fusion process, said body comprising an alumina refractory which (i) comprises at least 90 volume percent of crystalline $Al_2O_3$, and (ii) comprises one or more non-alumina secondary phases, wherein the sum of the volume percents of the one or more non-alumina secondary phases is less than or equal to four.

According to a fifth aspect, an isopipe is disclosed which comprises a body having a configuration adapted for use in a fusion process, said body comprising an alumina refractory which (i) comprises at least 90 volume percent of crystalline $Al_2O_3$, and (ii) has a porosity that is less than or equal to 8 volume percent.

According to a sixth aspect, a method for increasing the static fatigue of an isopipe used in a fusion process that produces glass sheets is disclosed, said method comprising forming the isopipe from an alumina refractory which comprises at least 90 volume percent of crystalline $Al_2O_3$ wherein:
 (i) the alumina refractory comprises a glass phase and the volume percent of the glass phase is less than or equal to one; and/or
 (ii) the alumina refractory comprises a glass phase and the glass of the glass phase:
  (a) comprises alumina and silica and on an oxide basis, the alumina and the silica comprise at least 90 mole percent of the glass;
  (b) on an oxide basis, the glass has an alkaline earth plus rare earth content that is greater than or equal to 2 mole percent; and
  (c) on an oxide basis, the glass has an alkali content that is less than or equal to 5.5 mole percent; and/or
 (iii) the alumina refractory comprises one or more non-alumina secondary phases and the sum of the volume percents of the one or more non-alumina secondary phases is less than or equal to four; and/or
 (iv) the alumina refractory has a porosity that is less than or equal to 8 volume percent.

According to a seventh aspect, a method of making an isopipe which has a configuration adapted for use in a fusion process is disclosed comprising: (a) providing a block of an alumina refractory which comprises at least 90 volume percent of crystalline $Al_2O_3$; and (b) forming the isopipe from said block, wherein:
 (i) the alumina refractory comprises a glass phase and the volume percent of the glass phase is less than or equal to one; and/or
 (ii) the alumina refractory comprises a glass phase and the glass of the glass phase:
  (a) comprises alumina and silica and on an oxide basis, the alumina and the silica comprise at least 90 mole percent of the glass;
  (b) on an oxide basis, the glass has an alkaline earth plus rare earth content that is greater than or equal to 2 mole percent; and
  (c) on an oxide basis, the glass has an alkali content that is less than or equal to 5.5 mole percent; and/or
 (iii) the alumina refractory comprises one or more non-alumina secondary phases and the sum of the volume percents of the one or more non-alumina secondary phases is less than or equal to four; and/or
 (iv) the alumina refractory has a porosity that is less than or equal to 8 volume percent.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification. It is to be understood that both the foregoing general description and the following detailed description are merely exemplary of the invention and are intended to provide an overview or framework for understanding the nature and character of the invention. It is also to be understood that the various features of the invention disclosed in this specification and in the drawings can be used in any and all combinations.

DETAILED DESCRIPTION

A. The Problem with Conventional Alumina Materials

Figure 1:
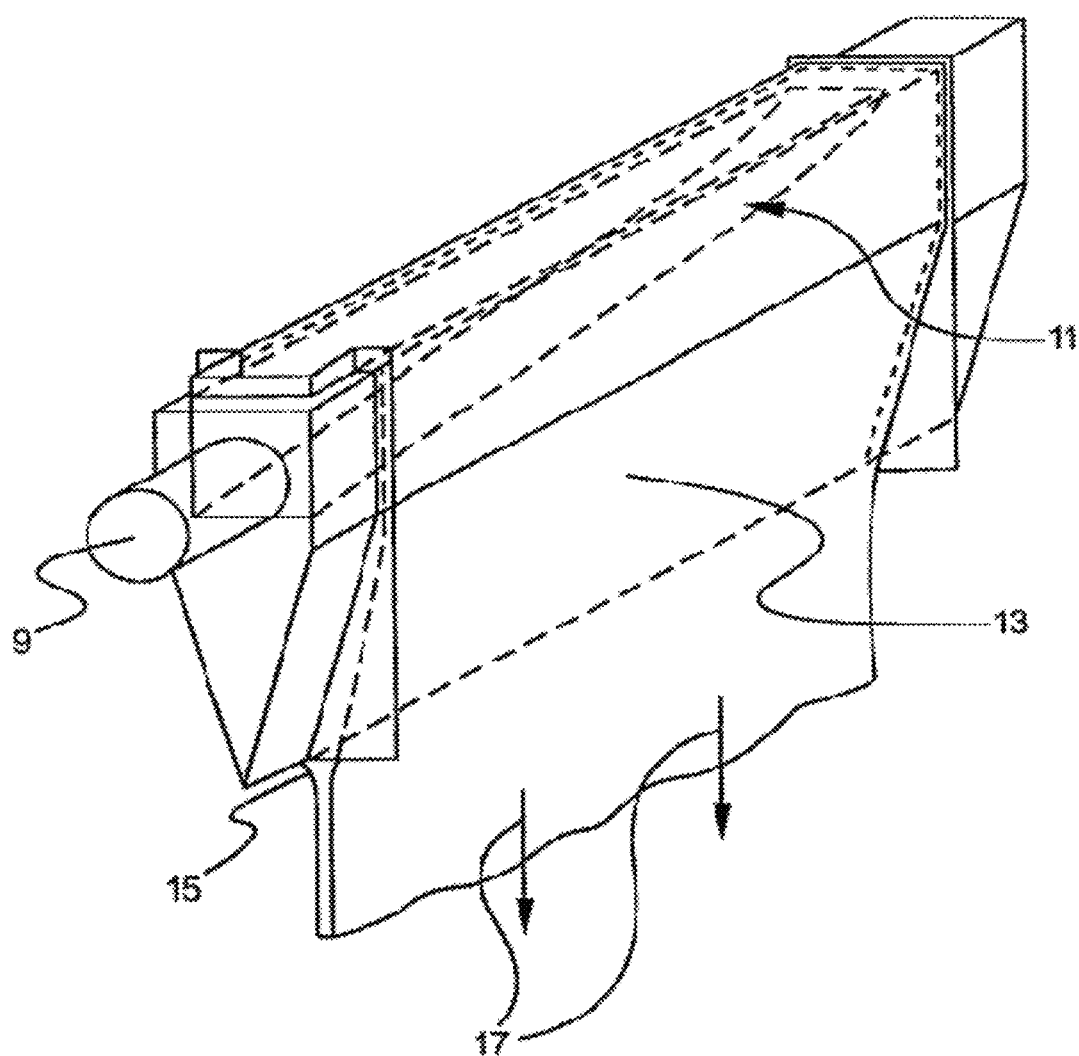
FIG. 1 is a schematic drawing illustrating a representative construction for an isopipe for use in an overflow downdraw fusion process for making flat glass sheets. This drawing is not intended to indicate scale or relative proportions of the elements shown therein.
Figure 2:
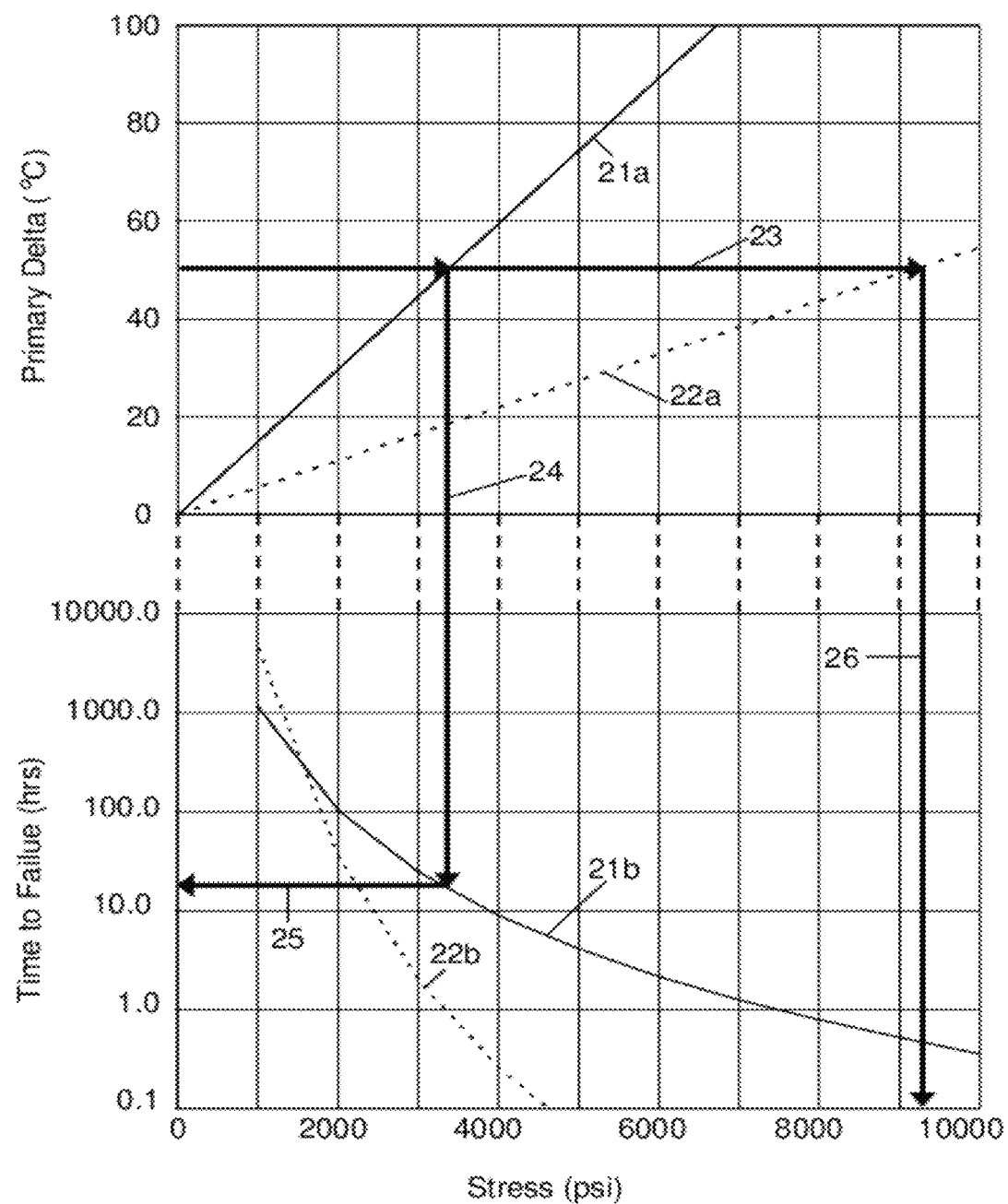
FIG. 2 is a plot of stress (horizontal axis) versus (a) primary delta (vertical axis; upper portion of figure) and (b) time-to-failure (vertical axis; lower portion of figure) for the zircon of the '786 patent (see below) and A1148 alumina.

FIG. 2 summarizes various discoveries and insights of the present disclosure. This figure compares the static fatigue behavior in terms of time-to-failure of zircon and A1148 alumina. The zircon used in constructing this figure was of the type disclosed in the above-referenced U.S. Pat. No. 6,974,786 and was manufactured by St. Gobain-SEFPRO of Louisville, Ky. This zircon, which will be referred to herein as the "zircon of the '786 patent," has performed successfully for many years in isopipes used to make substrates for liquid crystal displays, e.g., GEN 8 and larger substrates. The A1148 alumina was also manufactured by St. Gobain-SEFPRO and is listed on St. Gobian-SEFRO's website as suitable for making specialty glasses such as LCD glasses. The time-to-failure values were determined for an applied stress of 2,223 psi (see discussion below of FIG. 9).

FIG. 2 consists of two portions: 1) an upper portion which plots temperature difference (vertical axis in ° C.) between the weirs and root of an isopipe against the maximum calculated stress (see Section (B) below) experienced by an isopipe for that temperature difference (horizontal axis in psi); and 2) a lower portion which plots static fatigue (vertical axis in hours) against maximum stress (horizontal axis in psi). Specifically, the static fatigue of the lower portion is plotted as the time-to-failure of the material at the specified stress (see Section (B) below which describes the experimental protocol used to determine static fatigue). In the upper and lower portions of FIG. 2, the behavior of the zircon material is identified by reference numbers 21a,21b, respectively, while the behavior of A1148 is identified by reference numbers 22a,22b, respectively.

Line 23 of FIG. 2 represents a weir-root temperature difference (primary delta) of 50° C., which is representative of the temperature differences an isopipe can be expected to experience during, for example, heat-up, repair, maintenance, and the like. Line 24 projects the zircon stress value of curve 21a for this primary delta onto the zircon static fatigue curve 21b, and line 25 projects that intersection onto the vertical axis of the lower portion of the figure (i.e., onto the time-to-failure axis). As can be seen, this series of projections gives a time-to-failure value for the zircon material of greater than 10 hours. Hence, as has been observed in practice, the zircon material is suitable for use as an isopipe material and does not represent an unreasonable static fatigue risk.

The behavior of the A1148 material, on the other hand, is literally off-the-chart when it comes to static fatigue and thus the concomitant risk of failure due to such fatigue. Line 26 projects the A1148 stress value of curve 22a for the 50° C. primary delta downward towards the A1148 static fatigue curve. As can be seen in FIG. 2, even for a time-to-failure as small as a tenth of an hour (6 minutes), line 26 does not even come close to intersecting static fatigue curve 22b. In practice, this means that A1148 can be expected to fail catastrophically when subjected to a typical thermal gradient.

In some situations, thermal gradients can be minimized by taking extraordinary measures to control the temperatures to which an isopipe is exposed. For example, such measures are at least theoretically possible during heat-up, but if used, they would significantly increase the costs associated with the glass manufacturing process. In other cases, the occurrence of thermal gradients are unpredictable and thus even extraordinary measures would not protect an A1148 isopipe. For example, the heating elements (glow-bars) used to control the temperature of an isopipe are known to fail during use, sometimes in as short as six months after deployment. Such a failure can easily result in a thermal gradient on the order of 50° C. As shown in FIG. 2, a gradient of this magnitude (or even much less) gives a time-to-failure period which is plainly too short to effect a replacement of the failed heating element. Hence, even if an A1148 isopipe could be heated up to operating temperature without failing, it would be at the mercy of the unpredictable lives of its associated heating elements, which is plainly unacceptable.

Prior to the present disclosure, this fundamental flaw in the alumina material historically used to make isopipes was not recognized in the art, and thus a key aspect of the present disclosure is the recognition of this problem with isopipes which employ alumina materials, such as A1148.

B. The Analysis that Led to the Discovery of the Source of the Problem

Figure 3:
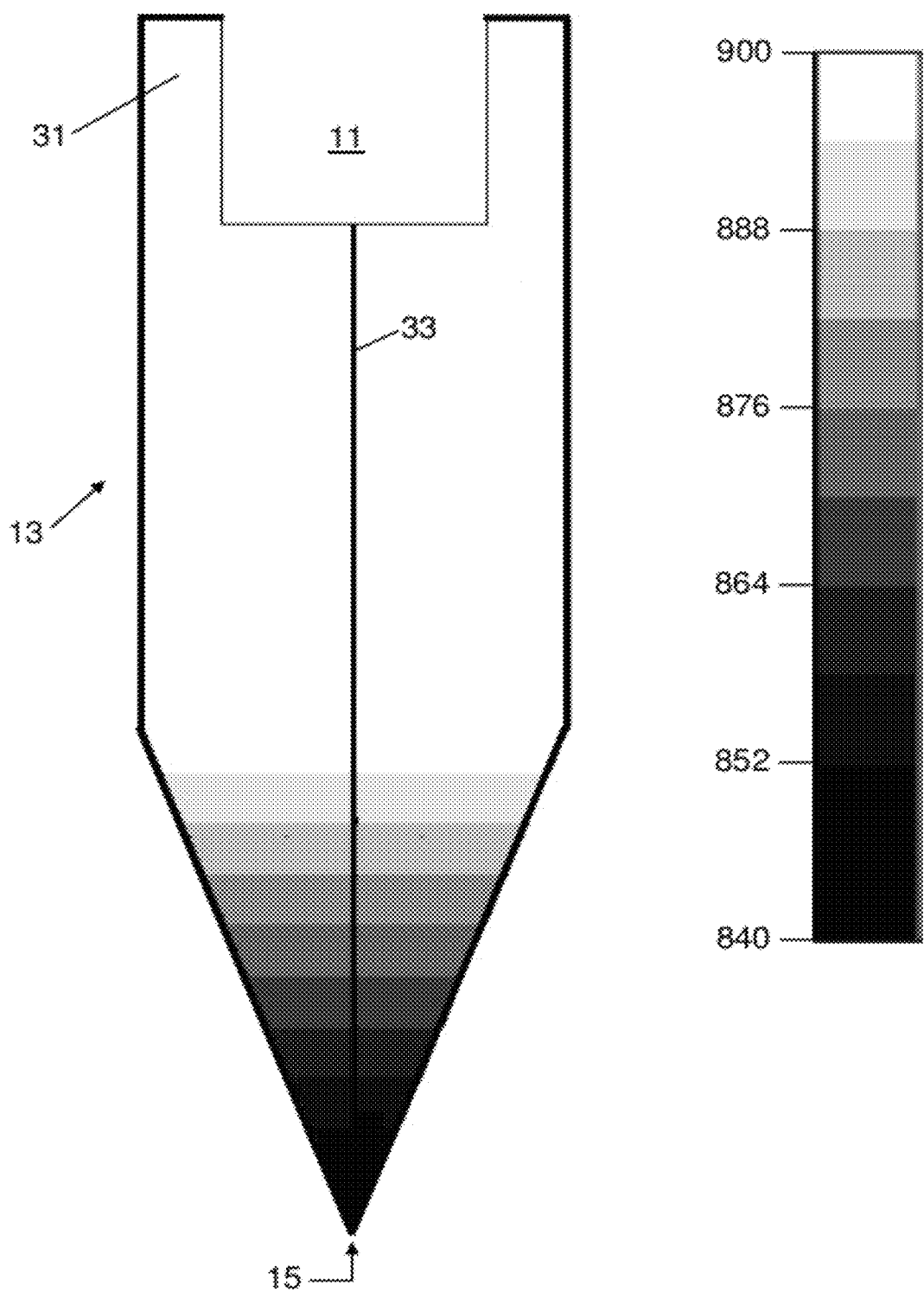
FIG. 3 is a plot of the temperature distribution used in calculating the stress distributions of FIGS. 7 and 8. The vertical scale is in ° C.

FIGS. 3-10 set forth the underlying data and analysis that led to FIG. 2. In particular, FIG. 3 shows the temperature distribution used to calculate the maximum stress values of the upper portion of FIG. 2. As can be seen in FIG. 3, as is typically the case, the weirs 31 of the isopipe 13 were hotter than the root 15, the temperature difference (primary delta) of FIG. 3 being 50° C. To simplify the analysis, end effects were ignored (i.e., the stress distribution was calculated in two dimensions) and the temperature distribution was assumed to be symmetric about the isopipe's centerline 33. Also, the maximum temperature was kept below 900° C. The reason for the choice of this temperature was as follows.

Figure 4:
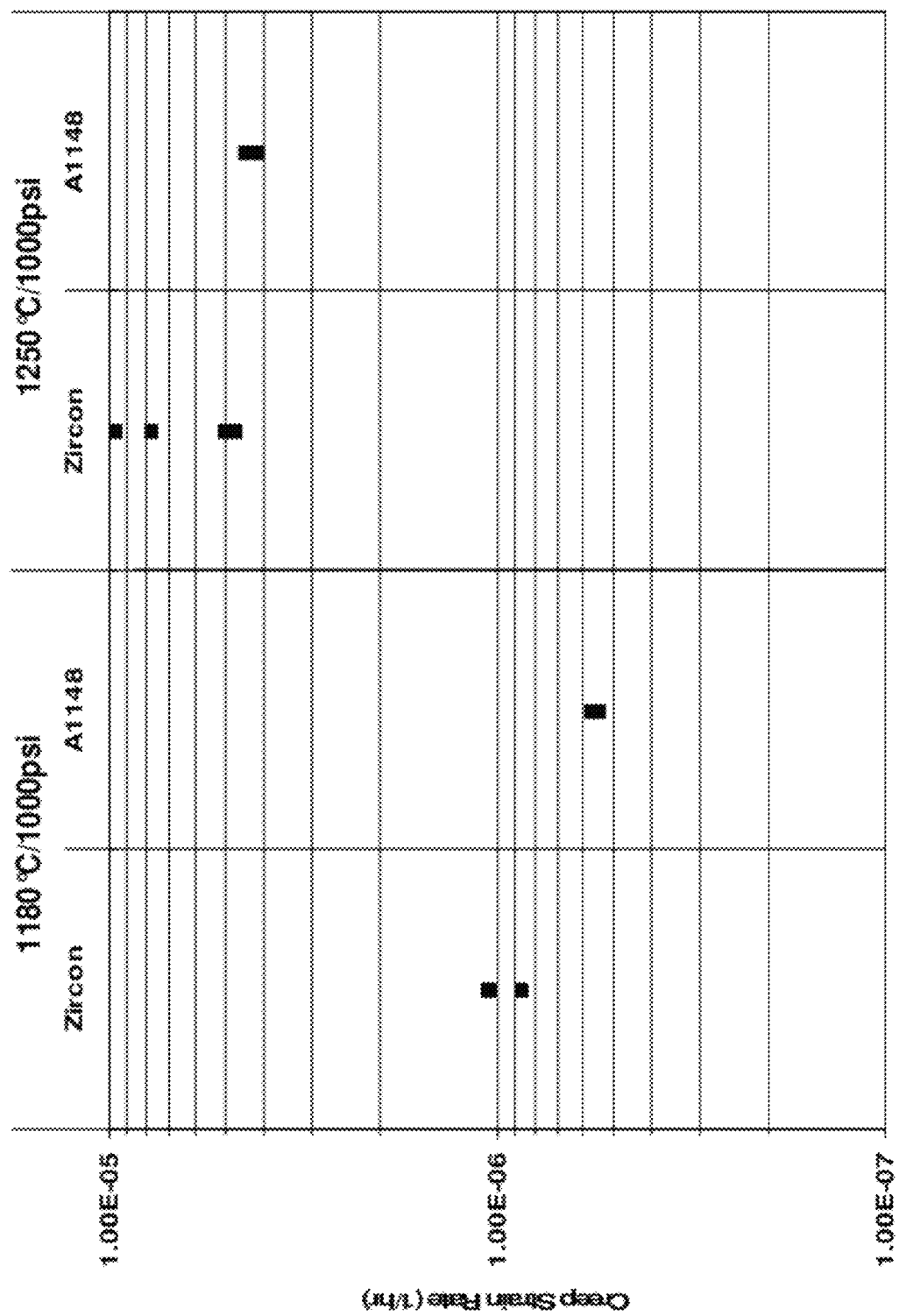
FIG. 4 is a plot of measured creep rates for the zircon of the '786 patent and A1148 alumina at 1180° C./1000 psi and 1250° C./1000 psi.

As noted above, A1148 has a lower creep rate than zircon, and thus if, as in the past, a material's creep rate were the primary criterion for a successful isopipe material, A1148 would seem to be better than zircon. FIG. 4 quantifies the difference between the creep rate of A1148 and the creep rate of the zircon of the '786 patent. As can be seen in this figure, both at 1180° C./1000 psi and 1250° C./1000 psi, the measured creep rate of the A1148 material is lower than that of the zircon material.

FIG. 4 further shows that as the temperature increases, the creep rate increases. In terms of the stress developed in a material as a result of a temperature gradient, a higher creep rate (provided it does not lead to excess sag) is advantageous since it provides a mechanism for stress relief. Accordingly, in terms of a static fatigue analysis, zircon's higher creep rate immediately puts A1148 at a disadvantage, even though that higher creep rate is, more broadly, undesirable. To avoid this bias, the maximum temperature used in the analysis was set at 900° C., a temperature at which the creep rates of both the A1148 and zircon materials is sufficiently small so as not to meaningfully affect the calculated stress values.

Figure 5:
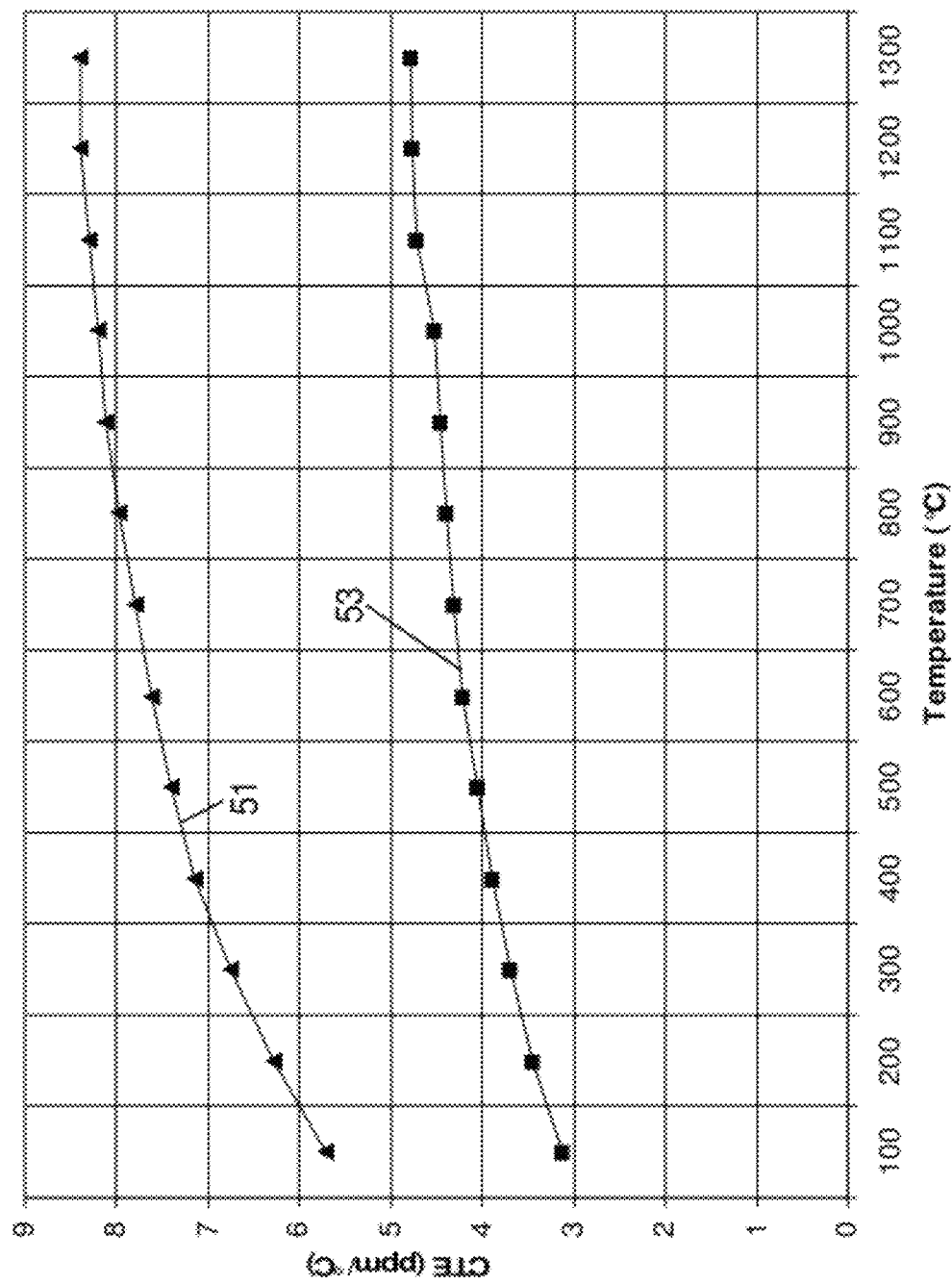
FIG. 5 is a plot of measured CTE values for the zircon of the '786 patent and A1148 alumina.

With creep rate eliminated, the parameters used in the stress analysis were coefficient of thermal expansion (CTE) and Young's modulus (E). FIG. 5 plots the CTE of A1148 (curve 51) and the zircon of the '786 patent (curve 53) over the temperature range from 100° C. to 1300° C., where each value represents the average CTE between room temperature (nominally 25° C.) and the specified temperature. As can be seen in this figure, the CTE of A1148 is consistently higher than that of the zircon of the '786 patent, the increase being almost 100% at around 900° C. Accordingly, for the same temperature delta, e.g., 50° C., the alumina material will expand almost twice as much as the zircon material.

Figure 6:
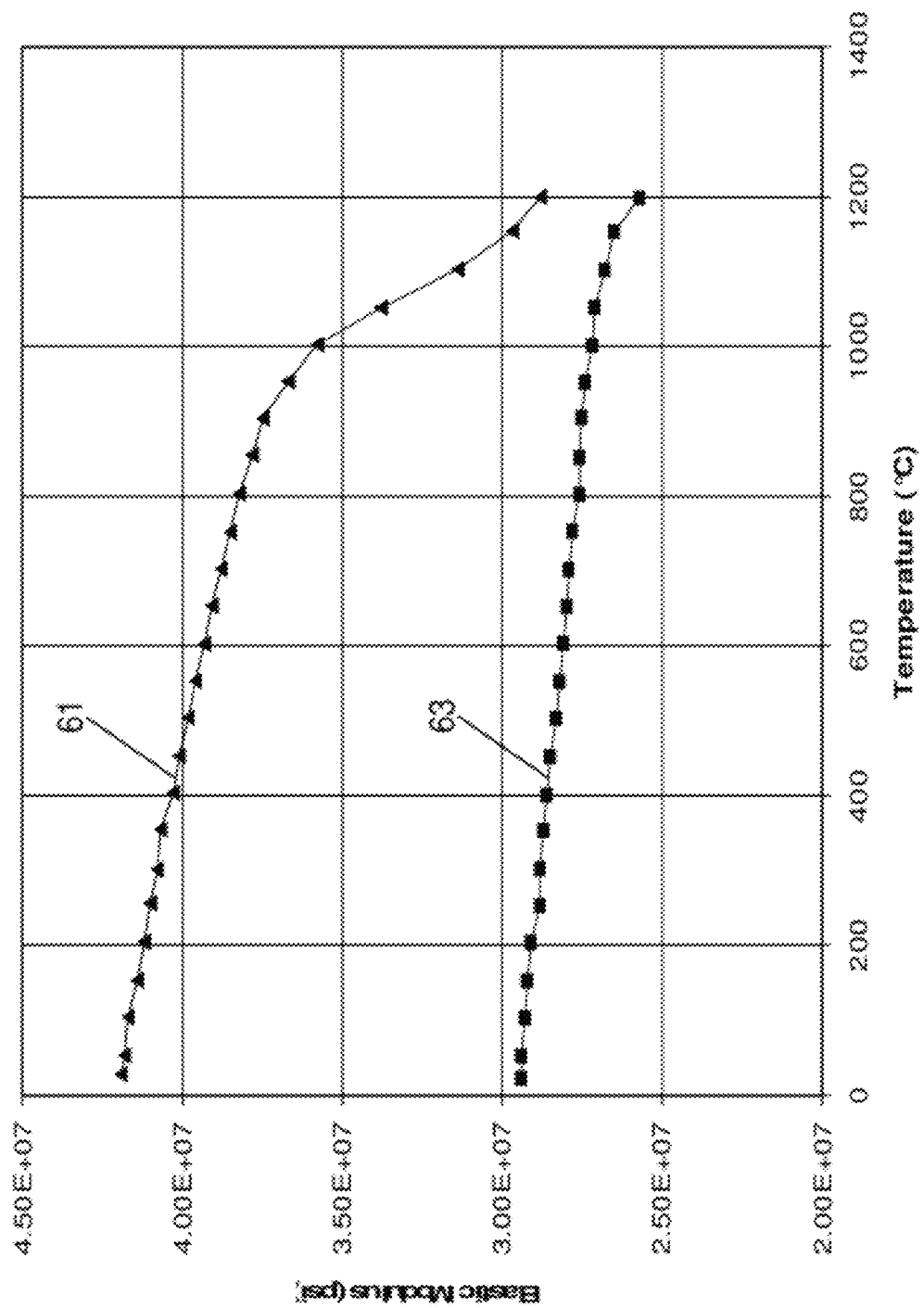
FIG. 6 is a plot of measured elastic modulus (Young's modulus) for the zircon of the '786 patent and A1148 alumina.

A material's Young's modulus is a measure of its stiffness, another name for the modulus being the "elastic" modulus. In general terms, the modulus relates the stress developed in a material for a given amount of strain (deformation), stiffer materials developing more stress for the same strain than less stiff materials. FIG. 6 plots the Young's moduli of A1148 (curve 61) and the zircon of the '786 patent (curve 63) over the temperature range from room temperature to 1200° C. As can be seen, the A1148 material is stiffer than the zircon material, the difference being approximately 30% at 900° C. Hence, not only will A1148 expand more than the zircon of the '786 patent in response to a temperature gradient because of its higher CTE, but it will also develop more stress because of its higher Young's modulus.

Figure 7:
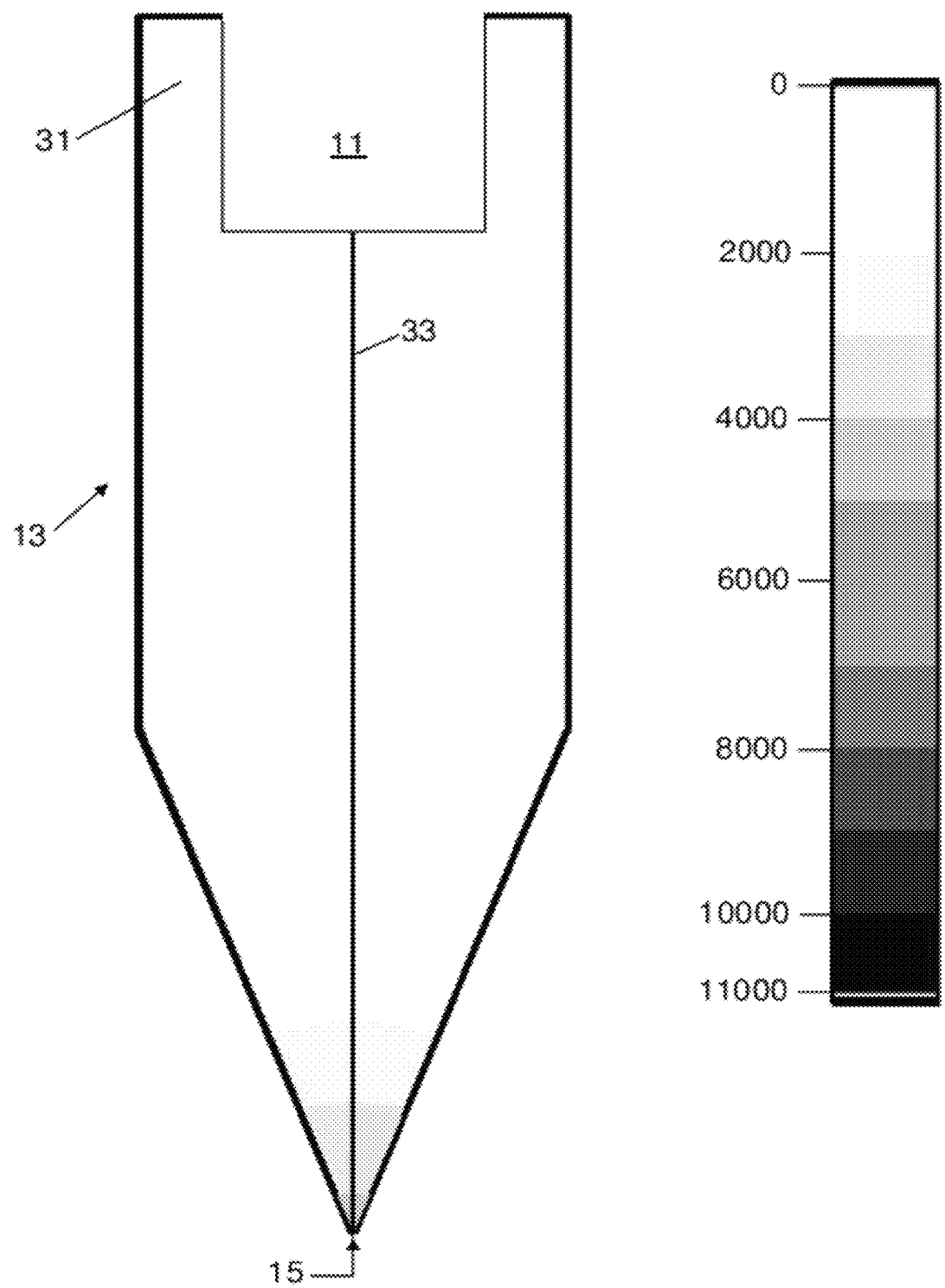
FIG. 7 is a calculated stress distribution for the zircon of the '786 patent. The vertical scale is in psi.
Figure 8:
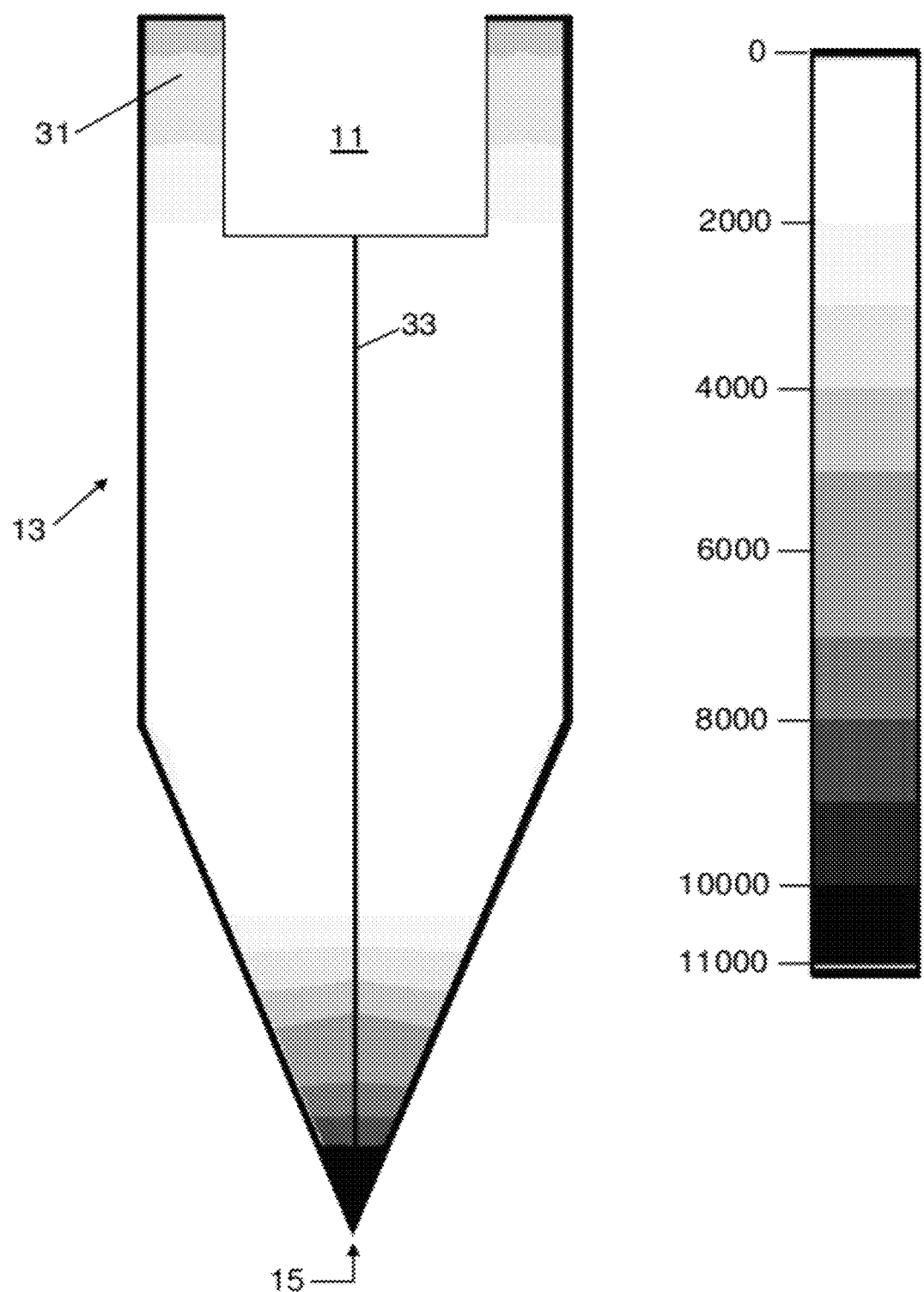
FIG. 8 is a calculated stress distribution for A1148 alumina. The vertical scale is in psi.

The combined effect of these two parameters is shown in FIGS. 7 and 8, where FIG. 7 shows the calculated stress distribution in an isopipe composed of the zircon of the '786 patent for the temperature distribution of FIG. 3, while FIG. 8 shows the stress distribution for the A1148 material for the same temperature distribution. In both cases, it was assumed that the isopipe was initially at room temperature and that the tension which developed at the root was not compensated for by mechanical root compression. The stress distributions shown in these figures were calculated using the commercially-available ANSYS program (Canonsburg, Pa. 15317), it being understood that similar calculations can be made using other commercially-available programs or programs specifically written to calculate stress distributions. Likewise, using the ANSYS or other programs, stress distributions can be calculated for other temperature distributions and isopipe configurations. In general terms, the stress in the isopipe due to a temperature change $\Delta T$ is equal to $E \cdot CTE \cdot \Delta T$, where E (Young's modulus) and CTE are each a function of the local temperature and thus vary from point to point in the isopipe.

The differences between FIGS. 7 and 8 are dramatic. The maximum stress for the A1148 material is around 9200 psi while that of the zircon material is only 3400 psi. Thus, the higher CTE and higher Young's modulus of the alumina material has led to a maximum stress almost three times larger than that calculated for the zircon material for the same temperature distribution.

The upper portion of FIG. 2 is based on calculations of the type shown in FIGS. 7 and 8, but with larger and smaller primary deltas. As can be seen therein, for each primary delta, the maximum stress for the alumina material is greater than that for the zircon material, and the disparity becomes larger, the larger the primary delta. To make matters worse, for a given stress, the static fatigue of A1148 is lower than that of the zircon of the '786 patent.

Figure 9:
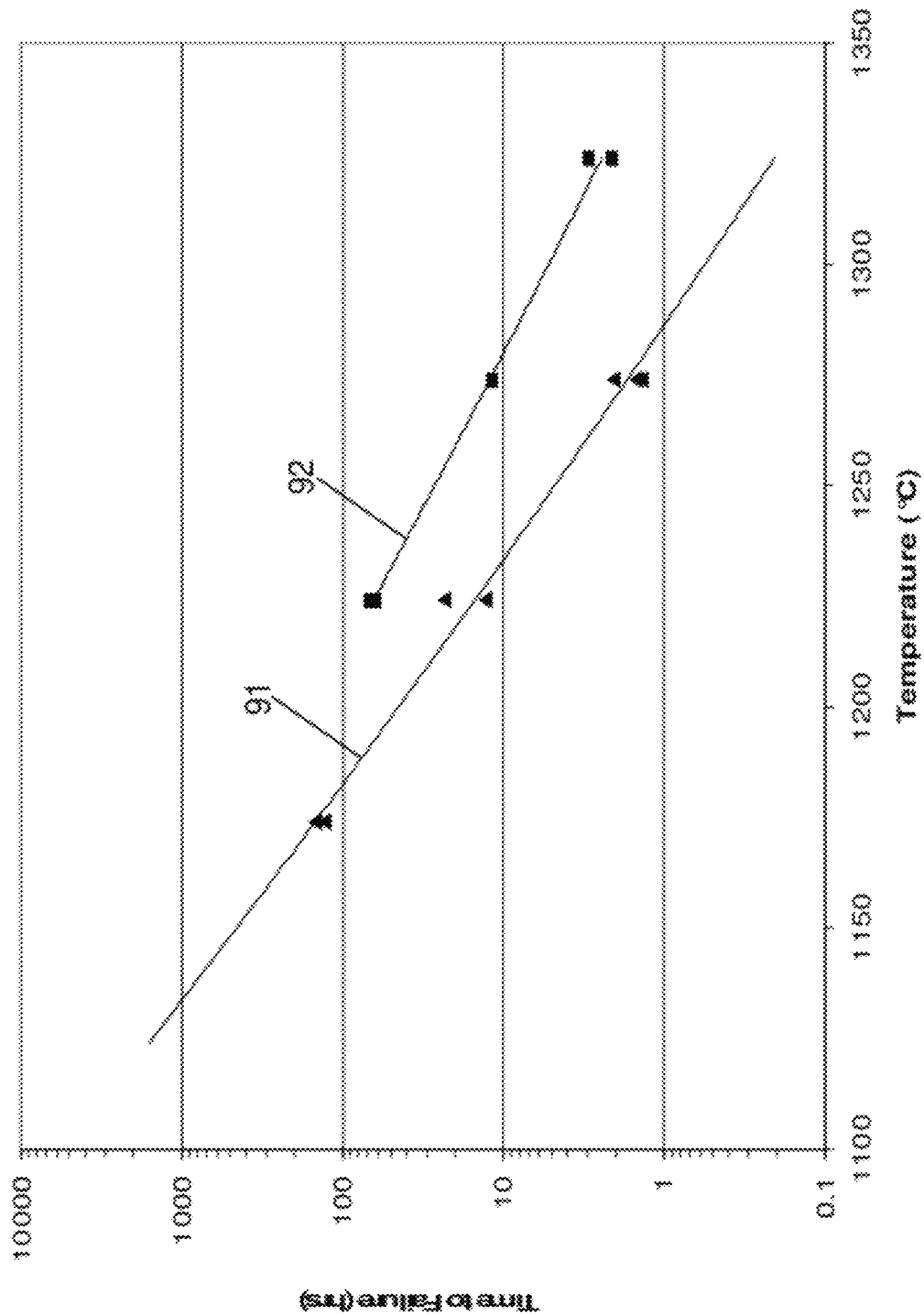
FIG. 9 is a plot of measured times-to-failure for the zircon of the '786 patent and A1148 alumina at an applied stress of 2,223 psi. The axes are given as log time-to-failure vs. temperature.
Figure 10:
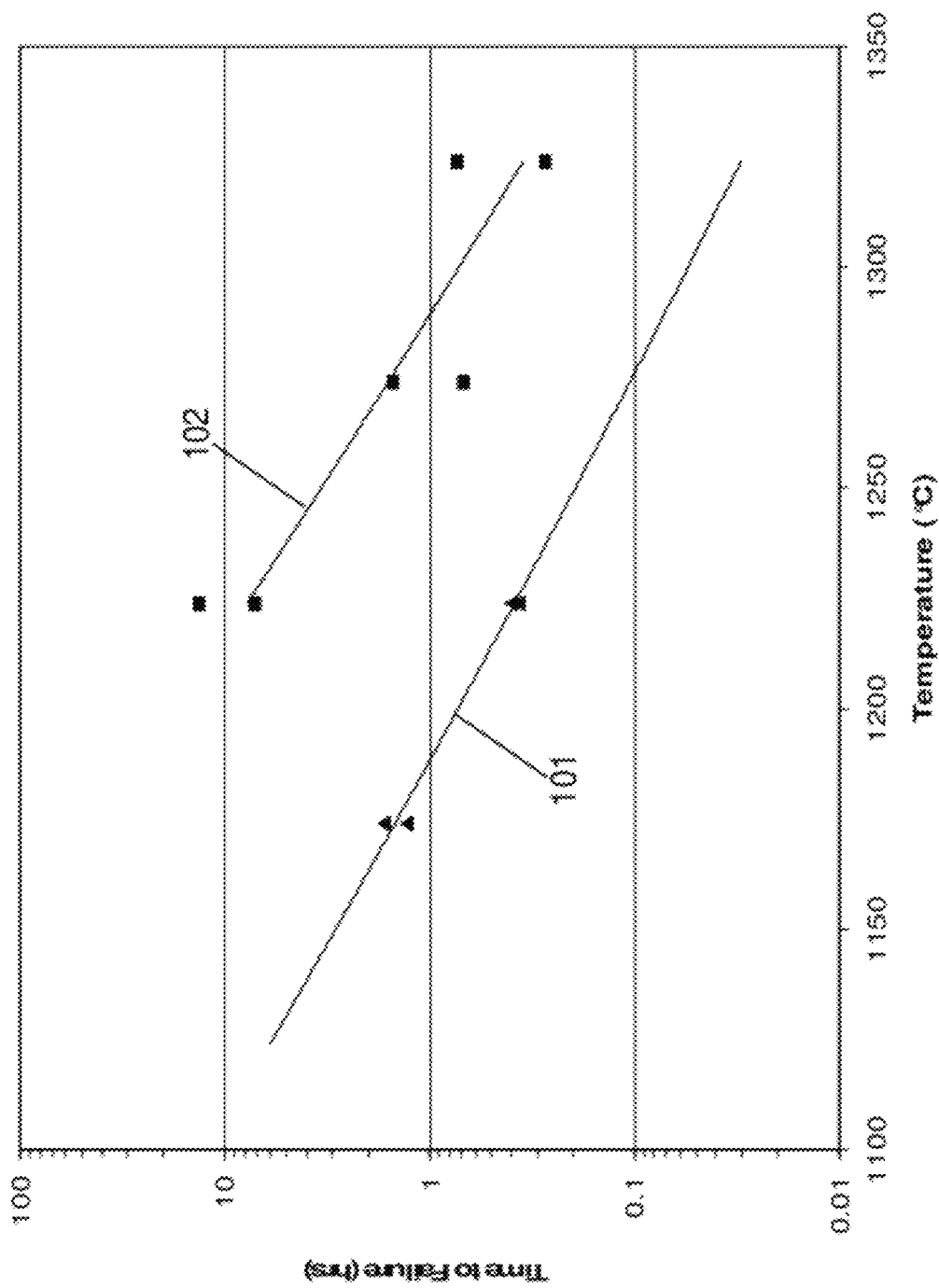
FIG. 10 is a plot of measured times-to-failure for the zircon of the '786 patent and A1148 alumina at an applied stress of 3,818 psi. The axes are given as log time-to-failure vs. temperature.

This further deficit in A1148 is illustrated in FIGS. 9 and 10 which show measured static fatigue data for the A1148 alumina (triangular data points) and the zircon of the '786 patent (square data points) for two applied stresses representative of those which an isopipe can experience during use, i.e., 2,223 psi for FIG. 9 and 3,818 psi for FIG. 10. The curves in FIGS. 9 and 10 are log fits to the measured data, curves 91 and 101 being for the alumina material and curves 92 and 102 for the zircon material.

Procedures for obtaining static fatigue values are detailed in ASTM C 1576-05, the contents of which, including the ASTM standards referred to therein (e.g., ASTM C 1211-02 (2008)), are incorporated herein by reference. The data plotted in FIGS. 9 and 10, as well as that reported in Example 3 below, was obtained by performing a modified version of the 4-point 1/4 point static fatigue test of ASTM C 1576-05. Specifically, the specimen size used was 4"×0.315"×0.118" thick, the bottom span was 2.5", the upper span was 0.79", only the tensile side edges of the specimens were chamfered, constrained ceramic rollers were used to support the specimen, non-constrained ceramic rollers were used to apply the stress, and the number of specimens tested was less than that specified in the standard, e.g., 2-3 specimens were used. Nevertheless, the values reported herein are comparable to those that would be obtained following the ASTM protocol. Accordingly, the static fatigue values specified in the claims are intended to be determined in accordance with ASTM C 1576-05, using (1) specimens whose surfaces have been ground to a 325 grit since this grit gives surface characteristics similar to those of a machined isopipe, and (2) an air-filled furnace heated to the relevant test temperature. The static fatigue values of Example 3 and FIGS. 9 and 10 were obtained using air-filled furnaces and specimens ground to a 325 grit. Although time-to-failure is a convenient and intuitive parameter for characterizing the static fatigue of refractory materials, if desired, the slow crack growth (SCG) parameters discussed in, for example, ASTM C 1576-05 can also be used for this purpose, e.g., the SCG parameters "n" and/or "$D_S$" can be used to characterize alumina materials in terms of their static fatigue.

The test temperatures used in FIGS. 9 and 10 were 1174° C., 1224° C., 1274° C., and 1324° C., which are representative of those that an isopipe can be expected to experience during use. As can be seen in these figures, the A1148 alumina material was found to have static fatigue values, i.e., time-to-failure values, that were consistently shorter than those of the zircon material of the '786 patent, e.g., an order of magnitude shorter at 3,818 psi.

As discussed above and illustrated in FIG. 2, when A1148's static fatigue data is combined with its CTE data and its Young's modulus, it becomes clear that this material is not suitable for use in an isopipe under the conditions of use now employed in the practice of the fusion process.

FIG. 2 is for the particular case of a primary delta of 50° C. and a base temperature of 900° C. To ensure safe operation, an alumina isopipe needs to at least match the static fatigue behavior of the zircon material of the '786 patent under the representative modern operating conditions of a base temperature of 1200° C. and a primary delta of 60° C., which produces a maximum calculated stress for a typical isopipe configuration of about 4000 psi. The zircon material of the '786 patent has a time-to-failure value of greater than 1 hour at 1200° C. and 4000 psi. Because of the higher stress levels developed in alumina materials, the 4000 psi value equates to 10,000 psi. Thus, to be viable for use in forming the body of an isopipe, an alumina material needs to have a time-to-failure of at least 1 hour at 1200° C. and 10,000 psi. With the problem thus identified, we turn next to its solution.

C. The Solution of the Problem

In theory, the inability of A1148 alumina to serve as an isopipe material in modern applications of the fusion process could be attacked by lowering the material's CTE, lowering its Young's modulus, and/or increasing its rate of creep.

In accordance with one aspect of the present disclosure, it has been determined that these approaches are ineffective in solving the problem. In particular, for alumina refractories, i.e., refractories which are at least 50 volume percent $Al_2O_3$ (see Definitions above), CTE and Young's modulus are difficult to reduce since their values are generally pegged to that of the $Al_2O_3$ making up the refractory. The creep rate can be increased, but this approach is self-defeating since it leads to higher levels of sag and thus shorter isopipe lives. Also, creep is ineffective in dealing with failure problems associated with start-up and thermal upsets, both of which take place over time periods too short to allow for substantial stress relief due to creep.

Rather than these approaches, in accordance with one of the aspects of this disclosure, it has been found that the static fatigue of alumina materials for use in isopipes can be directly increased and, in particular, can be sufficiently increased to make alumina isopipes viable under the modern use conditions. In general terms, the static fatigue exhibited by an alumina material depends on 1) initial flaw size and 2) flaw (crack) growth.

Initial flaw size depends on, among other things, the surface characteristics of the material at the time of use. Commercially-produced isopipes are formed by machining an isopipe configuration in a block of refractory material. As discussed above, such machining typically gives a 325 grit surface. Smoother surfaces with smaller initial flaws are, of course, possible, but would increase the already high cost of isopipes.

The growth of an initial flaw (crack growth) can occur by a variety of mechanisms. For example, cracks can simply grow by the failure of molecular bonds in the material at the crack tip. This can occur along grain boundaries in polycrystalline bodies and sometimes across grains when low strength cleavage planes are oriented near the plane of the growing crack. A variation of this is the attack of the stretched molecular bonds at the crack tip by vapor or liquid species, water being a common culprit. At high temperatures, glass phases in the refractory can be of sufficiently low viscosity so as to participate in molecular bond breaking at crack tips.

At elevated temperatures, some creep mechanisms are also present in the high stress and elastic/plastic strain field of the crack tip. These mechanisms are in addition to the material's macro creep rate which is related to the ceramic's viscosity. Because near the crack tip the stresses and strains can be intense, the processes that normally occur in creep, can occur at somewhat lower temperatures at a crack tip during static fatigue.

Grain boundary sliding and cavitation (see below) can also occur at the crack tip, with the sliding commonly occurring at ~45 degrees above and below the main crack plane. A glass phase at the grain boundaries increases the amount of grain boundary sliding, and allows it to happen at lower temperatures when the glass has a lower viscosity than the alumina (ceramic). Diffusion, sometimes assisted by glass layers, can transport mass into the intense stresses near the crack tip. The net effect is that crack growth can be faster and static fatigue lifetime shorter when glass is present.

In some cases it has been found that having some glass in an alumina refractory can reduce the stress and strain at the crack tip without extensive crack growth provided the glass has the proper viscosity at the use temperature of the alumina. In addition, viscous relaxation of the stresses at the crack tip, provided it occurs without micro scale crack growth, can slow the rate of macro scale crack growth. With enough glass in the proper viscosity range, the crack can proceed through the alumina grains by grain fracture or cleavage, and/or along the alumina grain boundaries, but leave ligaments of glass bridging the ceramic behind the crack tip. These ligaments can support some of the stress by bridging the faces of the crack and can absorb energy as the ligaments are stretched. This bridging lowers the apparent stress at the crack tip, reducing the crack growth rate. These effects occur over limited temperature ranges, and when that beneficial temperature range is exceeded, static fatigue and creep resistance becomes poor.

In accordance with the present disclosure, it has been determined that when, as is typical, an alumina refractory has non-alumina secondary phases, e.g., a glass phase and/or one or more non-alumina crystalline phases, (e.g., a mullite phase, a spinel phase, and/or one or more Zr—Ti—Al oxides phases), then on a volume percent basis, the sum of the volume percents of the non-alumina secondary phases should be less than or equal to 4.0 volume percent, where the volume percentages are determined by computer analysis of SEM images, e.g., analyses performed on backscattered electron images using IMAGE PRO PLUS software (Media Cybernetics, Inc., Bethesda, Md.) or similar software. In the case of alumina refractories which include a glass phase, in certain embodiments, that phase has a strain point above 570° C. and an anneal point above 620° C., where the strain point corresponds to a viscosity of $10^{14.5}$ poise and the anneal point to a viscosity of $10^{13.5}$ poise. The glass phase can, for example, be in the form of a thin glass grain boundary phase whose thickness is less than about one micron and can also fill small pockets at the corners of four and three grain junctions.

In terms of composition, the glass phase will comprise alumina and silica. Generally, the glass phase will have the same composition throughout the refractory, although in some cases variations may exist as a result of, for example, the manner in which the refractory was prepared. As used herein, the glass phase is considered a single phase even if it exhibits compositional variations.

In order to achieve the above-referenced viscosity values, the glass, in certain embodiments, contains alkaline earth and/or rare earth components e.g., CaO and/or MgO. For example, the alkaline earth plus rare earth content of the glass can be equal to or greater than 2.0 mole % (e.g., equal to or greater than 4 mole %, or equal to or greater 6 mole %). In connection with these embodiments, the alkaline earth plus rare earth content will generally be less than or equal to 30 mole % (e.g., less than or equal to 20 mole %, or less than or equal to 15 mole %). Again to achieve the above viscosity properties, the glass phase, in certain embodiments, has an alkali content ($Na_2O+K_2O+Li_2O$) which is less than or equal to 5.5 mole % on an oxide basis (e.g., less than or equal to 4 mole %, or less than or equal to 3 mole %). In still further embodiments, the glass' alkaline earth+rare earth content on a molar basis is greater than its alkali content.

Examples of suitable glass phases include alumino silicates, calcium alumino silicates, magnesium alumino silicates, barium alumino silicate, mixed Ca, Na alumino silicates with Ca/Na ratios>1, mixed Mg, Na alumino silicates with Mg/Na ratios>1, mixed Ca+Mg, Na alumino silicates with Ca+Mg/Na ratios>1, and yttrium and rare-earth alumino silicates. As discussed above, Li, Na, and K are less desirable than Mg, Ca, Ba, Y, and rare earths as glass components in the alumino silicate glasses of the glass phase. In general terms, more components can lower the viscosity of the glass phase which can assist in sintering, but can compromise static fatigue, as well as creep resistance.

The majority of the refractory is composed of one or more crystalline alumina phases which in combination are at least 90% of the volume of the body of the isopipe (e.g., at least 95% of the volume of the body of the isopipe). The alumina phase or phases include an α-alumina phase. In particular, in certain embodiments, at least 50 volume % of the body of the isopipe is α-alumina. The remainder (if any) of the alumina can be β-alumina and β-alumina. The amounts of these other alumina forms and, in particular, the amount of β-alumina, may need to be limited since these forms can be incompatible with some types of high-alkali glasses.

The grain size of the one or more crystalline alumina phases should be relatively large. As illustrated in Example 3 below, the grain size can be increased by annealing at an elevated temperature for an extended period of time. In general terms, the mean grain size of the alumina phases should be at least 5 microns, e.g., at least 20 microns or at least 40 microns. When the alumina includes α-alumina and another form of alumina, e.g., β-alumina, similar grain sizes (and porosity) are preferred for the various phases. As indicated above, the volume percent of β-alumina should be less than the volume percent of α-alumina.

In addition to the foregoing, in certain embodiments, the alumina's microstructure has less than 8 volume percent porosity and less than 4 volume percent of non-alumina secondary phases. In other embodiments, the total of the volume percents of the porosity and non-alumina secondary phases is less than 10%, e.g., less than 8%. In still further embodiments, the zirconia content of the refractory is less than 10 volume percent (e.g., less than 2 volume percent) and/or the titania content is less than 10 volume percent (e.g., less than 2 volume percent). It should be noted that the foregoing microstructure/compositional features can be used in any and all combinations. For example, the alumina material can have less than 5 volume % porosity, less than 1 volume % glass, and less than 0.5 volume % of other non-alumina secondary phases (e.g., mullite).

In addition to its static fatigue, a successful alumina material needs to be sufficiently strong to withstand the transient forces to which it is subjected. Because it is brittle, the strength of an alumina material is controlled by small elastic defects. Strength-controlling elastic defects are usually cracks, flaws, or pores/pore clusters with sharp points oriented perpendicular to the highest tensile stress field. Often the highest tensile stresses occur on or near the surface of body. Cracks can come from machining the brittle ceramic body to its final shape with abrasive grinding and polishing. Pores and pore clusters are often a result of incomplete sintering or non-optimal powder processing. In general terms, manufacturing methods need to be selected so that the cracks, flaws, elastic defects, and pores, especially in critical areas, i.e., areas of high stress concentrations, are preferably in the range of less than 100 microns and lower, e.g., less than or equal to 50 microns.

Besides static fatigue and strength, as discussed above, creep deformation of isopipe materials is important for long term use. If the creep rate is too large, then the isopipe will sag or deform away from its preferred shape and eventually process changes to the sheet glass forming conditions cannot compensate for the sag/deformation. Steady state secondary creep in ceramic materials can often be described by the following equation: $\epsilon° = A \cdot \sigma^n \cdot e^{-Q/Rt}$, where $\epsilon°$ is the strain rate, A is a constant for the material which includes the effects of the geometry of the grains and the grain size, σ is stress, n is the stress exponent, Q is the activation energy, t is the absolute temperature, and R is the gas constant.

At the temperatures and stresses encountered for isopipes, pure or nominally pure alumina (hereinafter referred to collectively as "pure alumina") without porosity deforms in secondary creep by the Nabarro-Herring, lattice diffusion, or the Coble creep, grain boundary diffusion, mechanisms. The stresses on the grain boundaries raise the chemical potentials on the compressively stressed boundaries and lower the chemical potentials along the grain boundaries under tensile stress. The atoms, or alternatively the vacancies or other defects, diffuse in response to these differing chemical potentials, with matter moving from the compressive areas to the tensile areas. This movement of mass results in plastic strain.

With Nabarro-Herring and Coble creep, $\epsilon° = B \cdot D^{-m} \cdot \sigma^n \cdot e^{-Q/Rt}$, where $\epsilon°$ is the strain rate, B is a constant for the material which includes the geometry of the grains, d is the grain size, m is the grain size exponent, σ is stress, n is the stress exponent, Q is the activation energy, t the absolute temperature and R is the gas constant. Theory predicts m=2 and n=1 for Nabarro-Herring, and m=3 and n=1 for Coble creep. With ceramics one must also consider the coupled ambi-polar diffusion of differing cation and anion species. Generally, creep deformation is controlled by the slowest species on the species fastest path. Adding small amounts of glass allows higher transport rates for these species along the grain boundary. Essentially the glass increases the species diffusion coefficient and thickens the grain boundary allowing the diffusion path to carry more material. In pure alumina at larger grain sizes and higher temperatures, Nabarro-Herring is the operative mechanism, while at lower temperatures and finer grain sizes (<~5 microns), Coble creep begins to dominate. At very fine grain sizes, substantially submicron, usually in two or multi-phase bodies to prevent concurrent grain growth, alumina can creep so much that it is super plastic. Large volume percent glass additions also allow super plasticity.

When porosity is present in pure alumina, the pores can act as material sinks and sources, making the distance the atoms/defects have to travel shorter. These pores raise the stresses in initial creep due to stress concentration effects, but subsequently, in secondary creep, the diffusion eliminates this concentration and the stress is raised by only the reduction in effective area supporting the load. Defects larger than the grain size can allow some grain boundary sliding of nearby grains and the strain associated with this.

In addition to the effect glass has when in dense bodies, when glass is present with porosity, the glass can flow into the pores when the viscosity of the glass is very low. Glass along the grain boundaries can also allow grain boundary sliding to occur easier.

When the creep resistance is very low, generalized cavitation can occur. Glass usually assists cavitation, as does the porosity that is initially present. Generalized cavitation is the opening of porosity all over the body, usually with the cavities opening perpendicular to the maximum tensile stress. Large deformation strains are part of the general cavitation process, and thus is to be avoided with isopipes.

In certain embodiments, the alumina materials have creep rates lower than $1 \times 10^{-6}$/hour at 1250° C. and 1,000 psi. Such creep rates are of particular value for large isopipes, e.g., isopipes having a length greater than 80 inches.

The alumina refractories disclosed herein can be produced in various ways. For example, high purity, low porosity alumina can be made by obtaining commercial high purity powder, with particle sizes less than 5 microns or, in some cases, less than a micron, from commercial sources such as Alcoa (e.g., A16 SG), Ceralox, Biakowski, Sumitomo (e.g., AKP-30) and others. Optionally, less than 1 wt. % MgO (~0.1-0.2 wt. %) can be added in the form of an oxide, hydrate, carbonate, nitrate, chloride or other compound in distilled deionized water or other solvent. The solvent with the MgO/MgO-precursor(s) and the alumina is made into a slurry and the slurry carefully dried to avoid MgO/MgO-precursor segregation prior to formation of the ceramic powder body. Agglomerates of less than 10 microns and better, 1 micron, can lead to better powder packing, higher green density, better sintering and higher fired density. In some cases, the powder can be spray dried and/or can have binders and plasticizers.

The ceramic body can be formed from the powder by a variety of procedures, but for an isopipe, cold iso-pressing is applicable. Pressures from below 5 KPSI to higher than 40 KPSI can be used. Uniaxial cold pressing, uniaxial hot pressing, extrusion, slip casting, tape casting, pressure casting, hot isostatic pressing, injection molding, calendaring, electrophoretic deposition, wet slurry pressing and gel casting have all been used to make alumina bodies and can be used with the alumina materials disclosed herein. The ceramic body perform can be sintered on an alumina setter or in an alumina sagger box on alumina grog/setting sand. To obtain closed porosity and even nearly pore free bodies, the maximum temperature for the sintering can be between about 1150° C. to over 1600° C. in air for 30 minutes to days, depending on such factors as the average diameter of the alumina powder, the average green density prior to sintering, the extreme large end of the porosity distribution in the green body, and/or extreme green density variations that can lead to voids opening in the ceramic body due to differential sintering shrinkage. As known in the art, minor impurities can lead to exaggerated grain growth which can trap porosity within grains which can be difficult to remove.

As usual in materials processing, compromise needs to be achieved between the competing aims of product properties and ease of body fabrication, e.g., pressing, sintering and machining), as well as cost. Thus, the presence of glass in the alumina material can be helpful in lowering sintering temperatures and easing the purity requirements of the alumina powder. Likewise, some porosity can assist in sintering (by lower sintering shrinkage) and the ability to machine the body (by serving as a macro crack arrestor).

The alumina materials disclosed herein can provide a variety of advantages when formed into an isopipe. For example, an isopipe with a higher strength and a higher static fatigue strength can be heated to operation temperature faster, and the fusion draw temperature gradient can be imposed upon the isopipe faster with less chance of fracture. This reduces the time a major capital investment is standing idle. Higher strength and higher static fatigue strength also make the isopipe less susceptible to failure in the event of a thermal upset, such as that caused by loss of a heating element, a power loss to the heating elements in the draw system, or acts of nature (floods, earthquakes, hurricanes etc.). In addition, increased strength and increased static fatigue strength, as well as increased creep resistance, allows the isopipe to be larger, to operate at higher temperatures, and/or to remain in service longer.

EXAMPLES

The following non-limiting examples further illustrate the high static fatigue alumina materials disclosed herein, as well as various of the problems with the existing zircon material of the '786 patent and the A1148 alumina material.

Example 1

Incompatibility of Zircon with High Alkali Glasses

This example illustrates the incompatibility of the zircon of the '786 patent with high alkali glasses. The glass used in this experiment was of the type disclosed in U.S. application Ser. No. 12/542,946 referred to above and had an alkali content above 10 weight percent, specifically, 13.75 wt. %, the majority of which was $Na_2O$ with a small amount of $K_2O$.

Figure 11:
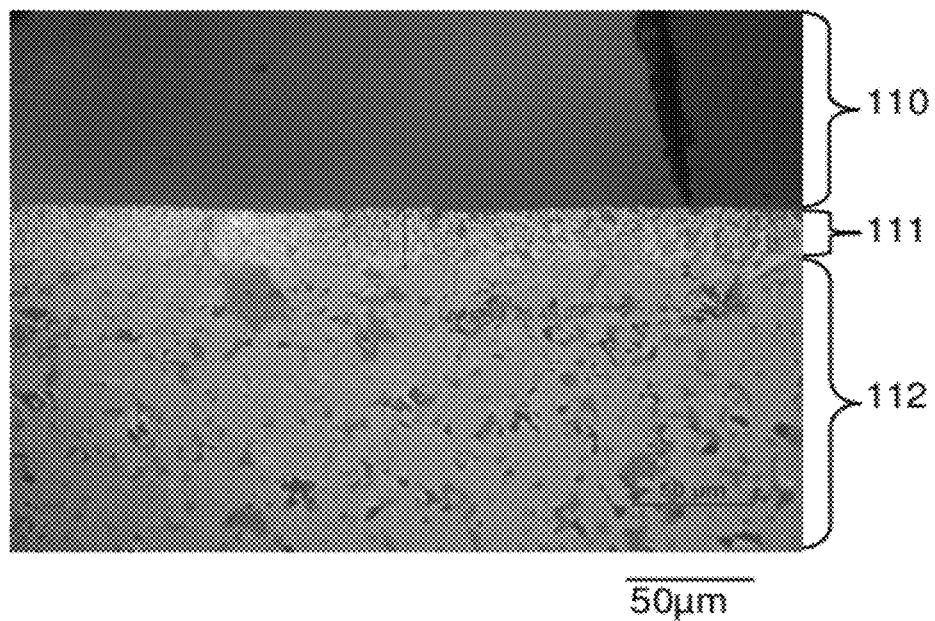
FIG. 11 is a photomicrograph illustrating the incompatibility of the zircon of the '786 patent with high alkali glasses.

The glass was heated to 1214° C. (viscosity=35 kpoise), and a sample of the zircon was rotated in the molten glass at a surface speed of 0.32 cm/sec for 14 days. FIG. 11 is a photomicrograph of the resulting glass/zircon interface. In this figure, 110 is the glass, 112 is the body of the zircon sample, and 111 is a wormy or fishegg-like layer of zirconia which was found to form at the surface of the zircon. The presence of this zirconia results in zirconia defects in the glass, making the zircon material unsuitable for use with high alkali glasses.

Example 2

Compatibility of A1148 Alumina with High Alkali Glasses

Figure 12:
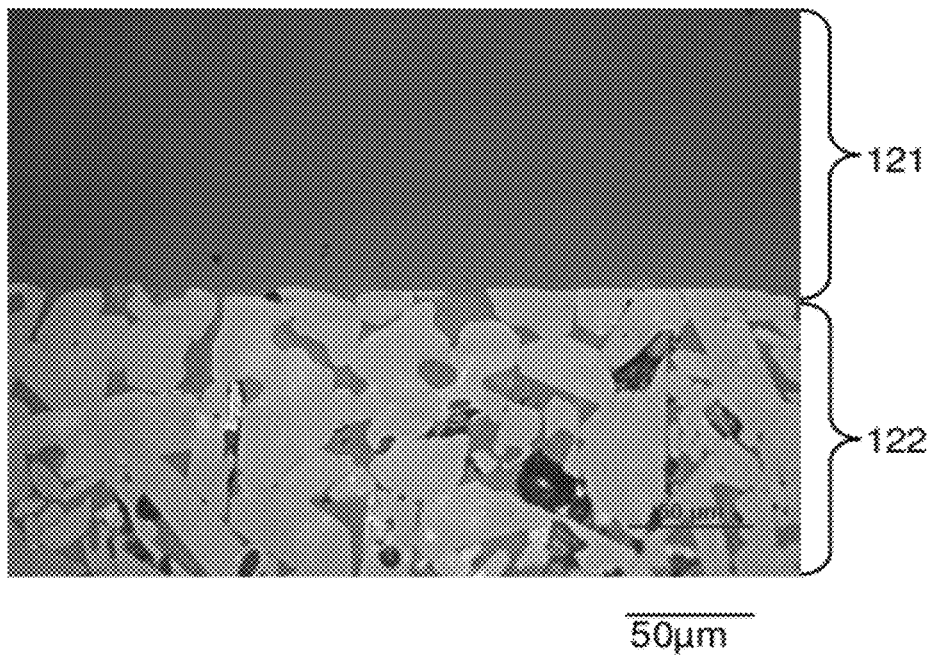
FIG. 12 is a photomicrograph illustrating the compatibility of A1148 alumina with high alkali glasses.

This example illustrates the compatibility of the A1148 alumina with high alkali glasses. The experiment of Example 1 was repeated using a sample of A1148 in place of the zircon sample. The results are shown in FIG. 12, where 121 is the glass and 122 is the A1148 alumina. As can be seen, the A1148 material is compatible with the high alkali glass, showing no changes in its appearance over the test period.

Example 3

Preparation of High Static Fatigue Alumina

This example illustrates the preparation of a high static fatigue alumina material (referred to herein as "HSF alumina") suitable for use as the body of an isopipe.

The starting materials for preparing the HSF alumina were alumina plates obtained from CoorsTek, Inc. (Golden, Colo.) and sold under the designation AD-998. As reported by the manufacturer, these plates are nominally 99.8 wt. % $Al_2O_3$.

Figure 13:
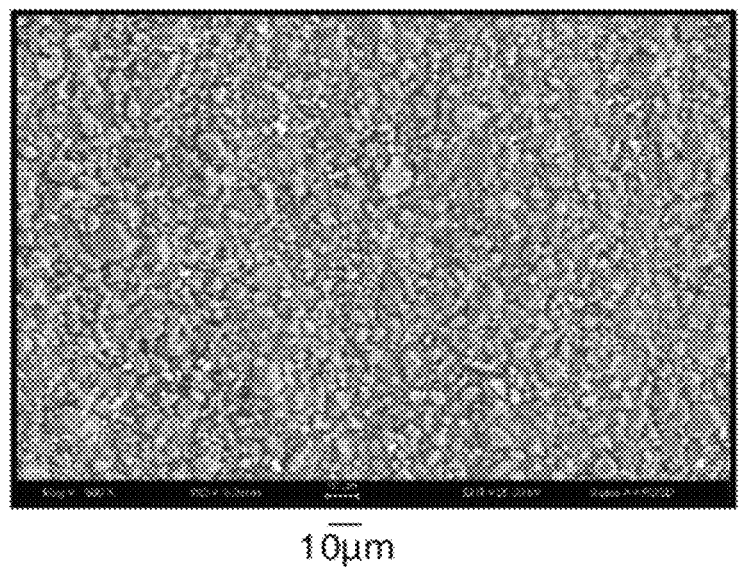
FIG. 13 is a SEM image illustrating the initial grain size of the 99.8% alumina used to produce the HSF alumina disclosed herein.
Figure 14:
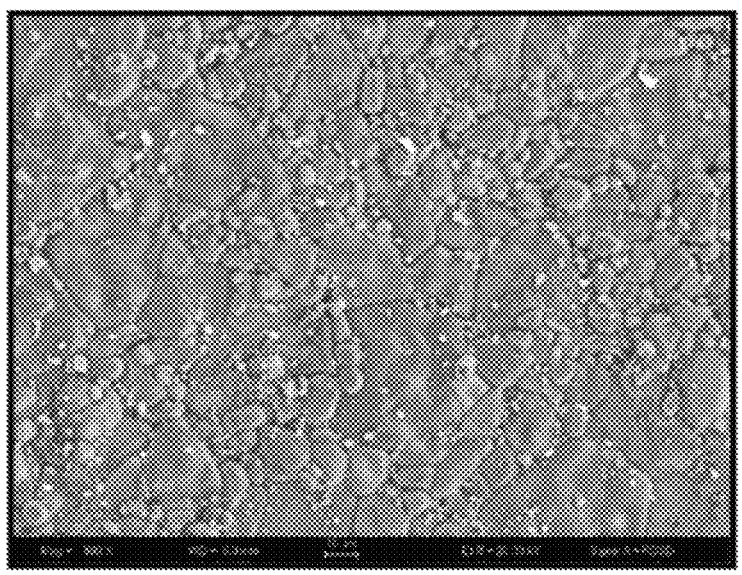
FIG. 14 is a SEM image illustrating the grain size of the 99.8% alumina of FIG. 13 after annealing at 1700° C. for 72 hours.
Figure 15:
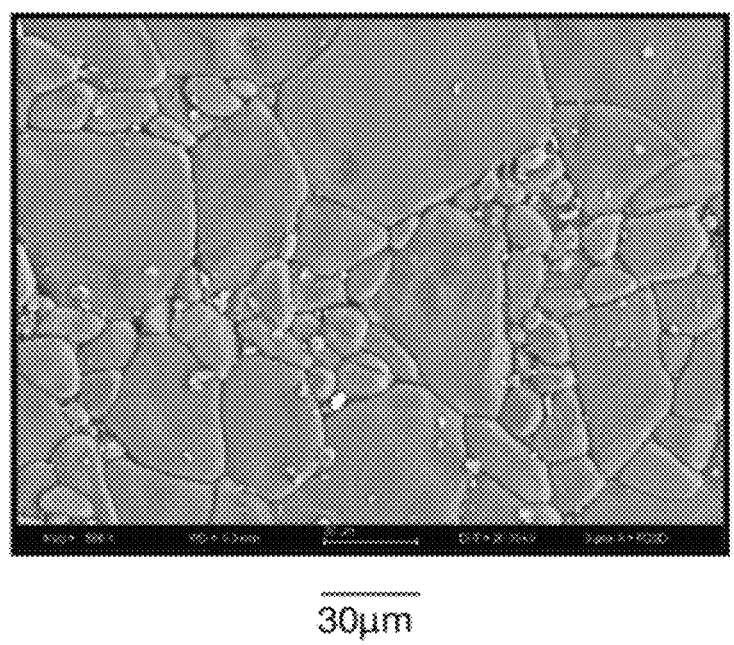
FIG. 15 is a SEM image illustrating the grain size of the 99.8% alumina of FIG. 13 after annealing at 1750° C. for 72 hours.

FIG. 13 is an SEM image illustrating the initial grain size of the AD-998 as received. To increase the grain size, the plates where put on high purity alumina setter sand in high purity sagger boxes and annealed at 1700° C. or 1750° C. for 72 hours in air. The results of this annealing process are shown in FIGS. 14 and 15, where FIG. 14 is for the 1700° C. anneal and FIG. 15 for the 1750° C. anneal. As can be seen, the resulting annealed ceramics had grains in the 20 to 50 micron size range, with the 1750° C. anneal producing the larger grains. Accordingly, the 1750° C.-annealed material was used in the testing reported in Examples 4 and 5 below.

Creep and static fatigue tests were performed on the HSF material. The creep tests gave a value of $9.9 \times 10^{-8}$/hour and $2.7 \times 10^{-7}$/hour at 1180° C./1000 psi and 1250° C./1000 psi, respectively. Comparison of these values with those of FIG. 4 shows that the HSF material has a lower creep rate than both the A1148 alumina and the zircon of the '786 patent. Accordingly, isopipes formed of the HSF material will exhibit less sag and thus have longer lifetimes than isopipes formed of the A1148 or zircon materials.

The static fatigue of the HSF material was determined at a temperature of 1224° C. and an applied stress of 3818 psi. After 197 hours, when the test was ended, the HSF material was still intact. This time-to-failure of at least about 200 hours at 3818 psi translates to a greater than 1 hour time-to-failure at 10,000 psi, thus showing that the HSF material is suitable for use as the body of an isopipe. For comparison, the static fatigue of A1148 alumina at 1224° C. and 3818 psi was approximately 0.4 hours (24 minutes), i.e., the HSF alumina's static fatigue was at a minimum 10 times greater than the A1148 material and can be approximately 490 times greater.

Figure 16:
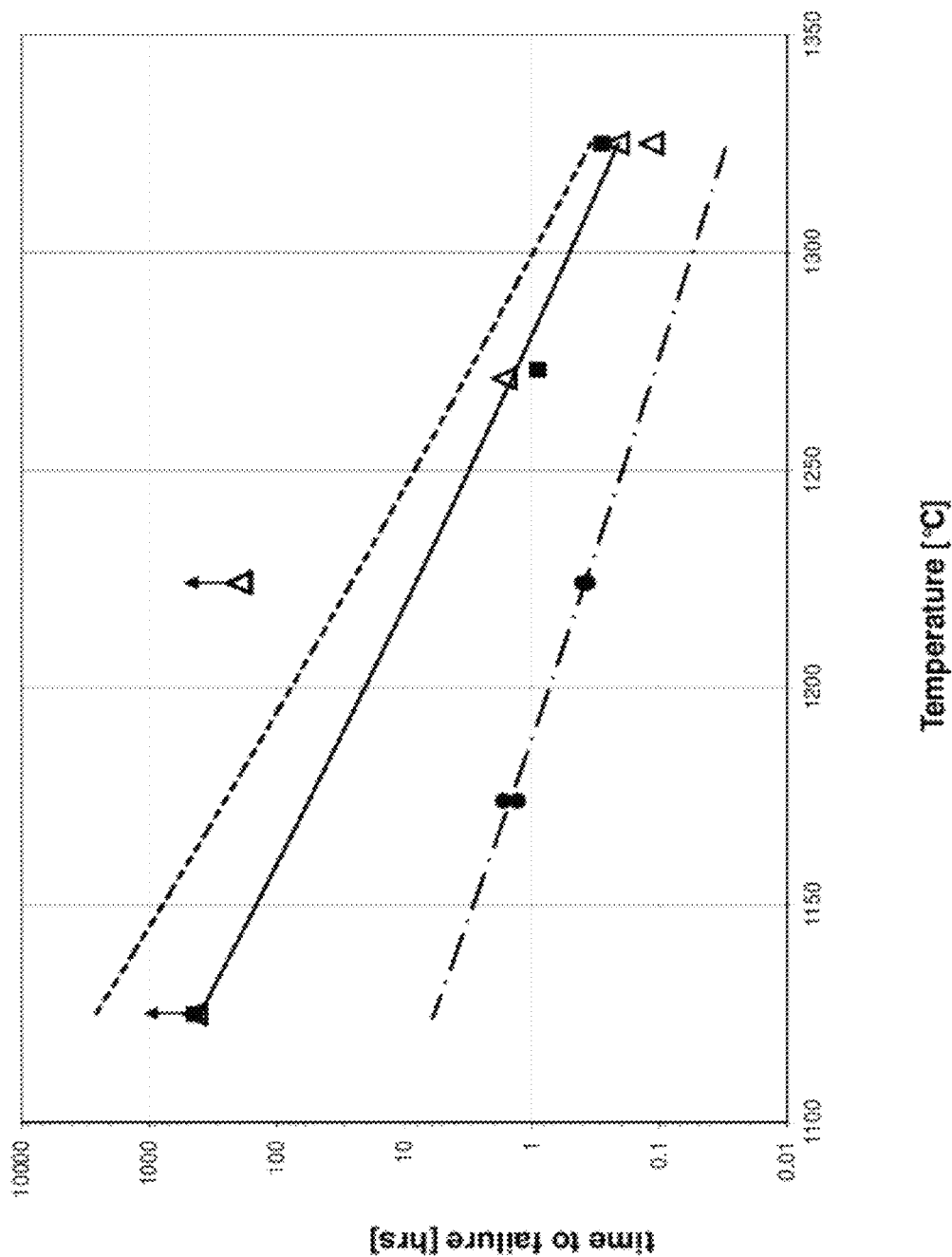
FIG. 16 is a plot of measured times-to-failure for the HSF material of Example 3 and A1148 alumina at an applied stress of 3,818 psi. The axes are given as log time-to-failure vs. temperature.
Figure 17:
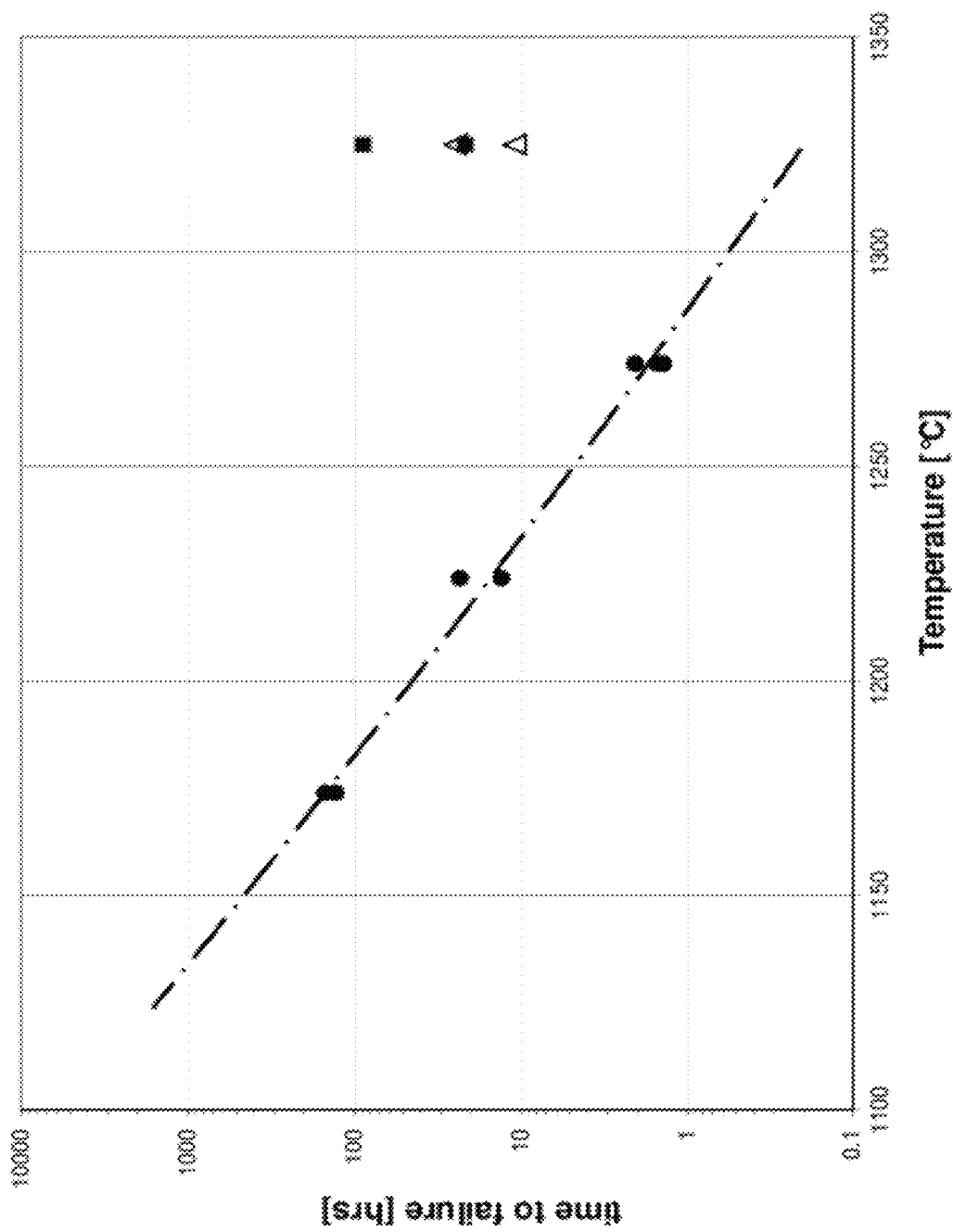
FIG. 17 is a plot of measured times-to-failure for the HSF material of Example 3 and A1148 alumina at an applied stress of 2,223 psi. The axes are given as log time-to-failure vs. temperature.

FIGS. 16 and 17 show further static fatigue data for the HSF materials of this example. In particular, FIG. 16 compares the static fatigue lifetime of A1148 (circular data points and the dot/dash line) with the HSF material (square data points and the solid line for the 1700° C. anneal; triangular data points and the dashed line for the 1750° C. anneal) as a function of temperature at a stress of 3818 psi. As indicated by the vertical arrows, the static fatigue bars for the 1750° C. anneal (large grain size) did not fail at 1125° C. or 1225° C., the static fatigue lifetimes being greater than 400 hours and greater than 200 hours, respectively. For the 1700° C. anneal (medium grain size), the fatigue bar did not fail at 1125° C. and the static fatigue lifetime was greater than 400 hours. As can be seen from the data of FIG. 16, the static fatigue lifetimes of the HSF materials were more than 2 orders of magnitude greater than those of A1148.

FIG. 17 further illustrates the improved static fatigue properties of the HSF materials compared to those of A1148. The experiments of this figure were performed at a stress of 2223 psi, and again, the A1148 data is shown by circles (and the dot/dash line) and the data of the HSF materials are shown by squares for the 1700° C. anneal and by triangles for the 1750° C. anneal. As shown in this figure, the HSF alumina materials had a lifetime at 1325° C. of 10-100 hours, greater than 60× to ~400× longer than the lifetime extrapolated for A1148, which would be in the range of 10 minutes.

Example 4

Compatibility of HSF Alumina with High Alkali Glasses

This example illustrates the compatibility of the HSF alumina of Example 3 with high alkali glasses.

Figure 18:
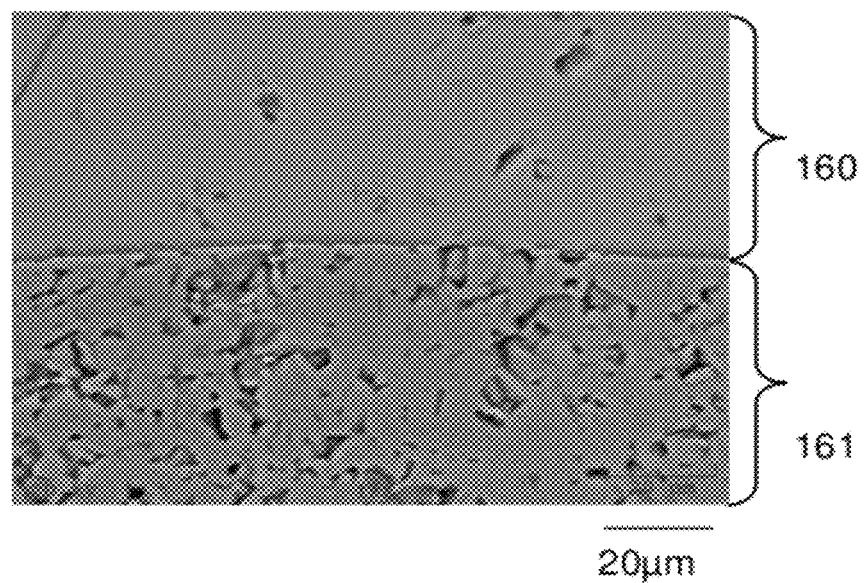
FIG. 18 is a photomicrograph illustrating the compatibility of HSF alumina disclosed herein with high alkali glasses.

A sample of the HSF alumina was placed in a cup, covered with cullet of the same high alkali glass as used in Examples 1 and 2, and heated to ~1204° C. for 72 hours. The interface of the glass and the sample was examined by optical microscopy for dissolution or precipitation. The results are shown in FIG. 18, where 160 is the glass and 161 the HSF alumina. As can be seen, the HSF alumina is compatible with the high alkali glass, showing no changes in its appearance over the test period.

It should be noted that as disclosed in commonly-assigned U.S. application Ser. No. 13/112,302, filed May 20, 2011, and entitled "Alumina Isopipes for Use with Tin-Containing Glasses," isopipes made from alumina materials can generate tin-containing defects at the fusion line of glass sheets made from tin-containing glasses. As explained in that application, acceptable levels of such defects can be achieved by using alumina materials that have low levels of the elements of group IVB of the periodic chart, i.e., Ti, Zr, and Hf, as well as low levels of Sn. The contents of U.S. application Ser. No. 13/112,302 are hereby incorporated herein by reference in their entirety.

Example 5

Comparison of HSF Alumina with A1148 Alumina

This example compares the composition and structure of the HSF alumina with A1148 alumina.

Figure 19:
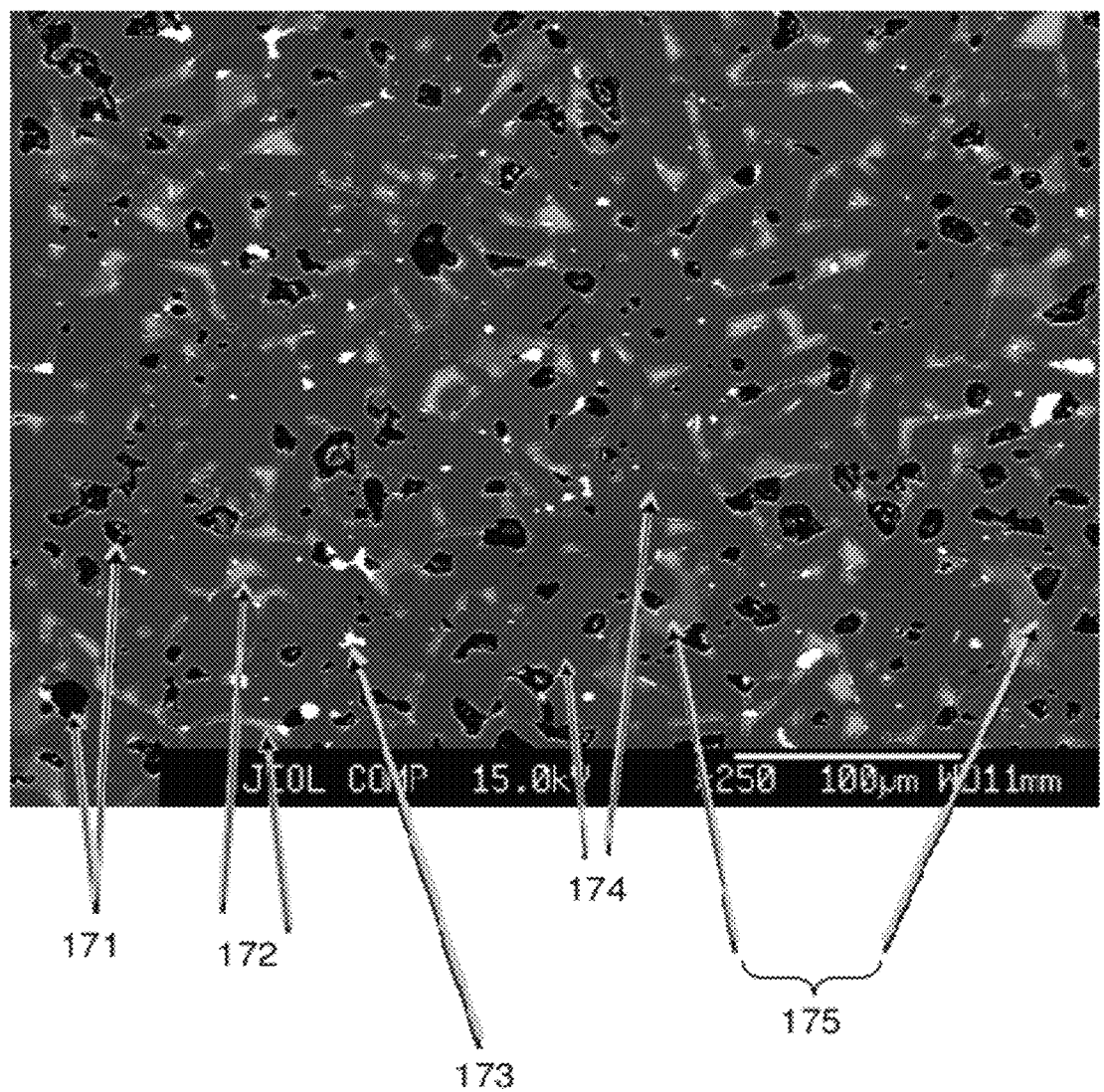
FIG. 19 is a SEM image of A1148 alumina.

FIG. 19 is a SEM backscatter electron image showing the overall structure of A1148, including its pores 171 (black in FIG. 19), its $Al_2O_3$ phase 174 (dark gray in FIG. 19), its mullite phase 175 (medium gray in FIG. 19), its glass phase 172 (light gray in FIG. 19), and its Zr—Ti—Al oxide phases 173 (white in FIG. 19). As can be seen, the A1148 material has a coarse microstructure with numerous large pores, pore strings, and cavities, which can be a source of low strength. It also has a large amount of secondary phases, including a glass phase that is mobile at the use temperature and can contribute to low creep resistance and very low static fatigue life.

Table 1 quantifies the A1148 phases in terms of their areas in SEM images. These area values correspond directly to volume percents. As can be seen in this table, A1148 has over 8.0 volume percent pores, over 1.3 volume percent each of mullite, glass, and Zr, Ti, Al oxides, and less than 90 volume percent $Al_2O_3$. Tables 3 and 4 set forth the results of an electron microprobe (EMPA) analysis of the glass phase of the A1148 alumina, the values of Table 3 being in weight percent and those of Table 4 in mole percent. As shown therein, the glass contains substantial amounts of $Na_2O$, which will lead to a relatively low viscosity for the glass at the operating temperature of a modern isopipe.

Figure 20:
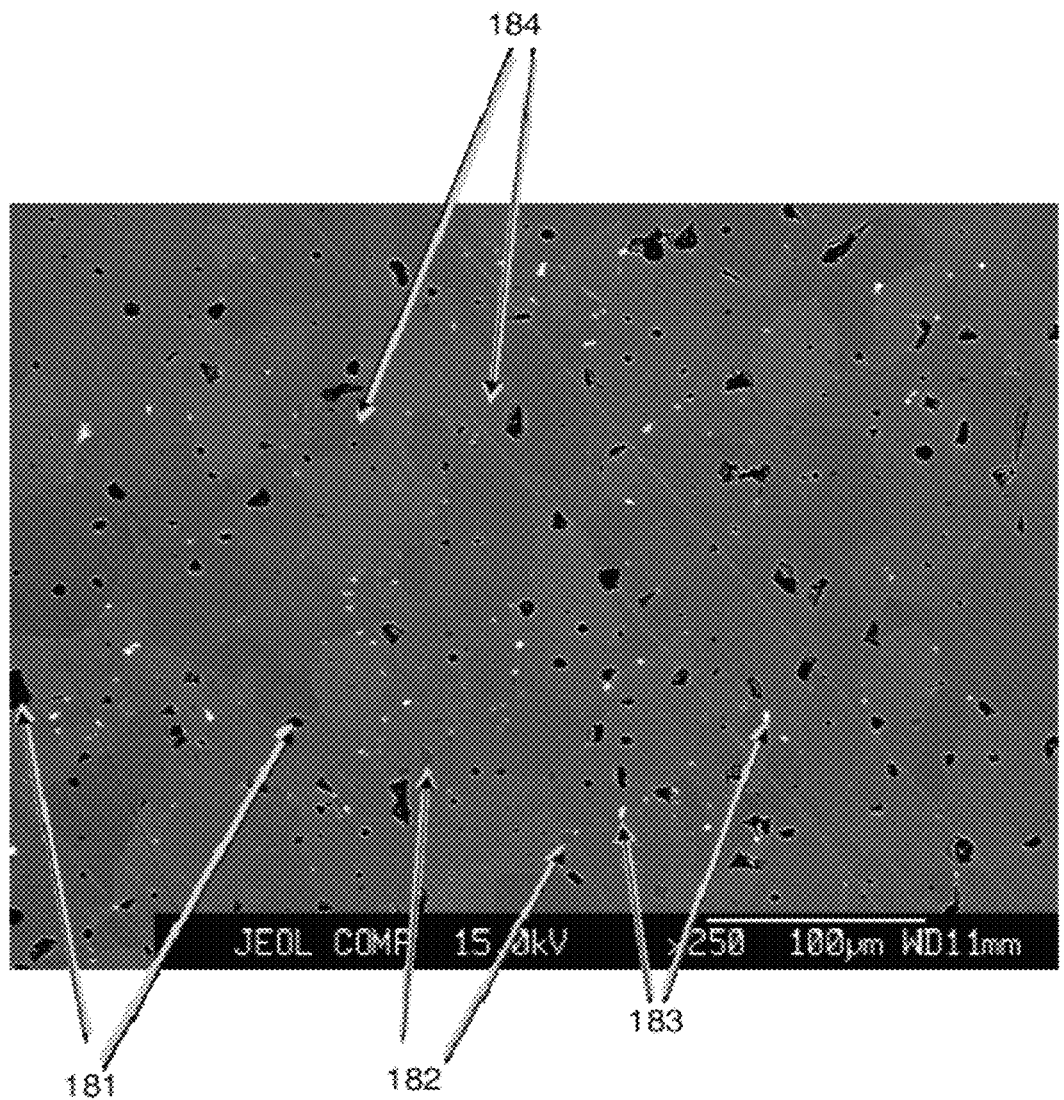
FIG. 20 is a SEM image of HSF alumina.

FIG. 20 is a SEM backscatter electron image showing the overall structure of the HSF alumina, including its pores 181 (black in FIG. 20), its $Al_2O_3$ phase 184 (dark and medium gray in FIG. 20), its glass phase 183 (white in FIG. 20), and its Mg, Al spinel phase 182 (gray with relief polish in FIG. 20), as well as its lack of a mullite phase and its lack of Zr—Ti—Al oxide phases. As can be seen from this figure, the HSF alumina has 1) almost no porosity, 2) grains in the 20 to 50 micron size range, and 3) almost no glass phase at the grain boundary. It also has no mullite and no Zr—Ti—Al oxide phases.

Table 2 quantifies the phases of the HSF alumina in terms of their areas in SEM images. As indicated above, these area values correspond directly to volume percents. As can be seen in this table, the HSF alumina has less than 2.5 volume percent pores, less than 0.5 volume percent glass, and more than 90 volume percent $Al_2O_3$. The alumina volume percent includes a very small amount of Mg, Al spinel of less than 2 volume %. In determining volume percents, the image analyzer was unable to differentiate between the spinel and the alumina. In the SEM picture, the spinel can be differentiated due to the relief polishing and slight indentation of the phase. Tables 3 and 4 set forth the results of an electron microprobe (EMPA) analysis of the glass phase of the HSF alumina. Unlike the A1148 alumina, the amount and size of the glass phase in the HSF alumina was too small for quantitative measurements, but aluminum, silicon and calcium where detected. No other cation elements where detected, e.g., alkali's were not detected. As can be seen from Tables 3 and 4, the glass of the HSF alumina is a Ca alumino-silicate with no detected alkali and thus will have a higher viscosity than the glass of the A1148 alumina at the operating temperature of a modern isopipe.

Example 6

Preparation of High Static Fatigue Alumina Using Alumina Powders

This example illustrates the preparation of high static fatigue alumina materials (again referred to herein as "HSF alumina") suitable for use as the body of an isopipe beginning with alumina powders.

Alumina ceramic powders with added aluminum magnesium oxide and binder where obtained from Ceralox/Sasol of Tucson, Ariz., USA. The alumina's used where the APA ready to press (APA-RTP SB) and AHPA ready to press (AHPA-RTP SB) types. The compositions of these powders, as reported by the manufacturer are shown in Table 5.

Bars of ~0.75×0.75 inch cross-section by ~6 inches in length and rods ~2.25 inches in diameter and approximately 11.2 inches long where sintered from these powders. The green unfired bars and rods where made by pouring the powder into rubber iso-static pressing bags. The bags where supported inside of aluminum containers which had openings drilled in the sheet metal for the hydraulic pressing fluid to access the rubber isopressing bag. The powders where vibrated to a higher tap density, both during and after filling the rubber bags with powder, and then the bag was sealed with a polymer "stopper" with a hose attachment and the air evacuated and the hose sealed with a clamp. The bars and rods where cold iso-statically pressed at 18,000 psi, for times of a few minutes at maximum pressure. The green samples where sintered at 1500-1650° C. for 2-4 hours, using heating and cooling schedules of ~ up to 110 hours.

Figure 21:
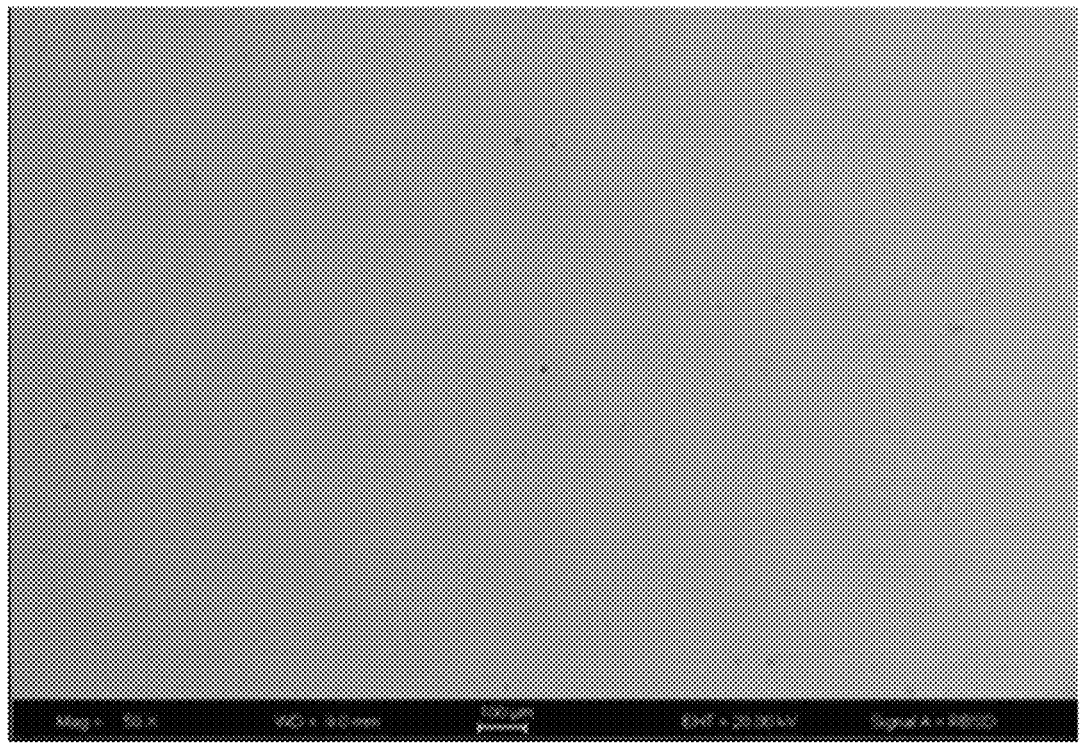
FIG. 21 is a SEM micrograph showing the microstructure of the HSF alumina material of Example 6 after grinding and polishing. The magnification for this figure was 50×. At a higher magnification of 1000×, porosity and secondary phases whose volume percent is less than 4 can be seen in this material.

A microstructure of a sample sintered from the APA powder is shown in FIG. 21, the AHPA material having a similar structure. In each case, the sintered samples were essentially alumina with less than 2% porosity, a very small amount of magnesium aluminate spinel (much less than 1%) and a very small amount of glass phase (less than 0.5%).

Three bars were tested for static fatigue. When tested for static fatigue lifetime at 8,000 psi and 1200° C., two bars made from the APA powder did not fail after 310 hours under stress and the bar made from AHPA did not fail after 549 hours under stress. The tests were terminated due to time constraints and thus the ultimate duration until failure was not determined.

The above lifetimes at 8,000 psi translate to a greater than 1 hour time-to-failure at 10,000 psi, thus showing that these HSF alumina materials are suitable for use as the body of an isopipe. In contrast, bars of A1148 failed at 1200° C. while loading to 8,000 psi, i.e. the bars had a fast fracture modulus of rupture of less than 8 Kpsi.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

A1148 Percent Areas

|  | Pores | $Al_2O_3$ | Mullite | Glass | Zr—Ti—Al Oxides | Total |
|---|---|---|---|---|---|---|
| Average | 8.40 | 86.49 | 1.40 | 1.41 | 1.44 | 99.14 |
| Min | 7.95 | 85.21 | 0.99 | 1.32 | 1.26 |  |
| Max | 8.97 | 87.60 | 1.65 | 1.48 | 1.53 |  |

TABLE 2

HSF Percent Areas

|  | Pores | $Al_2O_3$ | Mullite | Glass | Zr—Ti—Al Oxides | Total |
|---|---|---|---|---|---|---|
| Average | 2.30 | 97.02 | 0 | 0.27 | 0 | 99.95 |
| Min | 2.03 | 96.86 |  | 0.22 |  |  |
| Max | 2.43 | 97.29 |  | 0.31 |  |  |

TABLE 3

A1148 and HSF Glass Phases (weight percent)

| Component | A1148 | HSF |
|---|---|---|
| $SiO_2$ | 64.8 ± 0.7 | D |
| $Al_2O_3$ | 21.6 ± 0.8 | D |
| $TiO_2$ | 1.9 ± 0.3 | ND |
| $K_2O$ | 0.11 ± 0.01 | ND |
| $Na_2O$ | 5.6 ± 0.5 | ND |
| CaO | 3.3 ± 0.1 | D |
| MgO | 0.08 ± 0.01 | ND |
| $Fe_2O_3$ | 0.53 ± 0.05 | ND |
| $ZrO_2$ | 0.48 ± 0.06 | ND |
| Total | 98.52 |  |

D = Detected,
ND = Not Detected

TABLE 4

A1148 and HSF Glass Phases (mole percent)

| Component | A1148 | HSF |
|---|---|---|
| $SiO_2$* | 73.66 | D |
| $Al_2O_3$ | 14.12 | D |
| $TiO_2$ | 1.59 | ND |
| $K_2O$ | 0.08 | ND |
| $Na_2O$ | 6.02 | ND |
| CaO | 3.92 | D |
| MgO | 0.13 | ND |
| $Fe_2O_3$ | 0.22 | ND |
| $ZrO_2$ | 0.26 | ND |
| Total | 100.00 |  |

*By difference
D = Detected,
ND = Not Detected

TABLE 5

|  | Primary impurities (ppm) AHPA-RTP SB | Primary impurities (ppm) APA-RTP SB |
|---|---|---|
| $Al_2O_3$ Purity | >99.99% | 99.94% |
| Na | 15 | 10 |

TABLE 5-continued

|  | Primary impurities (ppm) AHPA-RTP SB | Primary impurities (ppm) APA-RTP SB |
|---|---|---|
| Si | 20 | 105 |
| Fe | 10 | 110 |
| Ca | 5 | 10 |
| Mg* | 300 | 300 |
| Ga | <5 | 40 |
| Cr | <2 | 10 |
| Ni | <2 | 5 |
| Ti | 15 | 30 |
| Zn | <2 | 45 |
| Zr | <2 | 3 |

*Mg level obtained from the addition of high purity magnesium aluminate spinel

What is claimed is:

1. An isopipe comprising a body having a configuration adapted for use in a fusion process that produces a glass ribbon from which glass sheets are separated, said configuration comprising an outer surface which, during use of the isopipe, causes two sheets of molten glass to meet and fuse into said glass ribbon, said body consisting of an alumina refractory which:
   (i) comprises (a) at least 90 volume percent of crystalline $Al_2O_3$ and (b) at most 4.0 volume percent of non-alumina secondary phases; and
   (ii) has a static fatigue in terms of time-to-failure of at least one hour at 1200°C. with an applied stress of 10,000 psi as measured in an air-filled furnace on specimens of the alumina refractory whose surfaces have been ground to a 325 grit per ASTM test method C 1576-05.

2. The isopipe of claim 1 wherein:
   (i) the alumina refractory comprises a glass phase; and
   (ii) the volume percent of the glass phase is less than or equal to one.

3. The isopipe of claim 1 wherein
   the alumina refractory comprises a glass phase.

4. The isopipe of claim 1 wherein the alumina refractory comprises a glass phase and the glass of the glass phase:
   (i) comprises alumina and silica; and
   (ii) on an oxide basis, the alumina and the silica comprise at least 90 mole percent of the glass.

5. The isopipe of claim 1 wherein the alumina refractory comprises a glass phase and the glass of the glass phase:
   (i) comprises alumina and silica; and
   (ii) on an oxide basis, the glass has an alkaline earth plus rare earth content that is greater than or equal to 2 mole percent.

6. The isopipe of claim 1 wherein the alumina refractory comprises a glass phase and the glass of the glass phase:
   (i) comprises alumina and silica; and
   (ii) on an oxide basis, the glass has an alkali content that is less than or equal to 5.5 mole percent.

7. The isopipe of claim 1 wherein:
   (i) the crystalline $Al_2O_3$ comprises α-alumina; and
   (ii) the α-alumina comprises at least 50 volume percent of the alumina refractory.

8. The isopipe of claim 1 wherein the alumina refractory has a porosity whose volume percent is less than or equal to eight.

9. The isopipe of claim 1 wherein:
   (i) the alumina refractory has porosity and a glass phase; and
   (ii) the sum of the volume percents of the porosity and the glass phase is less than or equal to eight.

10. The isopipe of claim 1 wherein the crystalline $Al_2O_3$ has a mean grain size equal to or greater than 20 microns.

11. The isopipe of claim 1 wherein the isopipe has a length of at least 2 meters.

12. A method of making glass sheets comprising:
    (a) forming a glass ribbon having a width of at least 1500 millimeters using an isopipe according to claim 1; and
    (b) separating glass sheets from the glass ribbon;
    wherein the glass making up the glass sheets comprises at least 5 weight percent alkali.

13. An isopipe comprising a body having a configuration adapted for use in a fusion process that produces a glass ribbon from which glass sheets are separated, said configuration comprising an outer surface which, during use of the isopipe, causes two sheets of molten glass to meet and fuse into said glass ribbon, said body consisting of an alumina refractory which:
    (i) comprises at least 90 volume percent of crystalline $Al_2O_3$,
    (ii) comprises a glass phase, wherein the volume percent of the glass phase is less than or equal to one, and
    (iii) has a static fatigue in terms of time-to-failure of at least one hour at 1200° C. with an applied stress of 10,000 psi as measured in an air-filled furnace on specimens of the alumina refractory whose surfaces have been ground to a 325 grit per ASTM test method C 1576-05.

14. A method of making glass sheets comprising:
    (a) forming a glass ribbon having a width of at least 1500 millimeters using an isopipe according to claim 13; and
    (b) separating glass sheets from the glass ribbon;
    wherein the glass making up the glass sheets comprises at least 5 weight percent alkali.

15. An isopipe comprising a body having a configuration adapted for use in a fusion process that produces a glass ribbon from which glass sheets are separated, said configuration comprising an outer surface which, during use of the isopipe, causes two sheets of molten glass to meet and fuse into said glass ribbon, said body consisting of an alumina refractory which:
    (i) comprises at least 90 volume percent of crystalline $Al_2O_3$,
    (ii) comprises a glass phase, wherein the glass of the glass phase:
       (a) comprises alumina and silica and on an oxide basis, the alumina and the silica comprise at least 90 mole percent of the glass;
       (b) on an oxide basis, the glass has an alkaline earth plus rare earth content that is greater than or equal to 2 mole percent; and
       (c) on an oxide basis, the glass has an alkali content that is less than or equal to 5.5 mole percent, and
    (iii) has a static fatigue in terms of time-to-failure of at least one hour at 1200° C. with an applied stress of 10,000 psi as measured in an air-filled furnace on specimens of the alumina refractory whose surfaces have been ground to a 325 grit per ASTM test method C 1576-05.

16. A method of making glass sheets comprising:
    (a) forming a glass ribbon having a width of at least 1500 millimeters using an isopipe according to claim 15; and
    (b) separating glass sheets from the glass ribbon;
    wherein the glass making up the glass sheets comprises at least 5 weight percent alkali.

17. An isopipe comprising a body having a configuration adapted for use in a fusion process that produces a glass ribbon from which glass sheets are separated, said configuration comprising an outer surface which, during use of the isopipe, causes two sheets of molten glass to meet and fuse into said glass ribbon, said body consisting of an alumina refractory which:
 (i) comprises at least 90 volume percent of crystalline $Al_2O_3$,
 (ii) has a porosity that is less than or equal to 8 volume percent, and
 (iii) has a static fatigue in terms of time-to-failure of at least one hour at 1200° C. with an applied stress of 10,000 psi as measured in an air-filled furnace on specimens of the alumina refractory whose surfaces have been ground to a 325 grit per ASTM test method C 1576-05.

18. The isopipe of claim 17 wherein the porosity is less than or equal to 5 volume percent.

19. A method of making glass sheets comprising:
 (a) forming a glass ribbon having a width of at least 1500 millimeters using an isopipe according to claim 17; and
 (b) separating glass sheets from the glass ribbon;
wherein the glass making up the glass sheets comprises at least 5 weight percent alkali.

20. An isopipe comprising a body having a configuration adapted for use in a fusion process that produces a glass ribbon from which glass sheets are separated, said configuration comprising an outer surface which, during use of the isopipe, causes two sheets of molten glass to meet and fuse into said glass ribbon, said body consisting of an alumina refractory which:
 (i) comprises at least 90 volume percent of crystalline $Al_2O_3$; and
 (ii) has a static fatigue in terms of time-to-failure of at least one hour at 1200° C. with an applied stress of 10,000 psi as measured in an air-filled furnace on specimens of the alumina refractory whose surfaces have been ground to a 325 grit per ASTM test method C 1576-05.

21. The isopipe of claim 20 wherein the alumina refractory comprises a glass phase.

22. The isopipe of claim 20 wherein the alumina refractory comprises a glass phase and the glass of the glass phase:
 (i) comprises alumina and silica; and
 (ii) on an oxide basis, the alumina and the silica comprise at least 90 mole percent of the glass.

23. The isopipe of claim 20 wherein the alumina refractory comprises a glass phase and the glass of the glass phase:
 (i) comprises alumina and silica; and
 (ii) on an oxide basis, the glass has an alkaline earth plus rare earth content that is greater than or equal to 2 mole percent.

24. The isopipe of claim 20 wherein the alumina refractory comprises a glass phase and the glass of the glass phase:
 (i) comprises alumina and silica; and
 (ii) on an oxide basis, the glass has an alkali content that is less than or equal to 5.5 mole percent.

25. The isopipe of claim 20 wherein:
 (i) the crystalline $Al_2O_3$ comprises α-alumina; and
 (ii) the α-alumina comprises at least 50 volume percent of the alumina refractory.

26. The isopipe of claim 20 wherein:
 (i) the alumina refractory has porosity and a glass phase; and
 (ii) the sum of the volume percents of the porosity and the glass phase is less than or equal to eight.

27. The isopipe of claim 20 wherein the crystalline $Al_2O_3$ has a mean grain size equal to or greater than 20 microns.

28. The isopipe of claim 20 wherein the isopipe has a length of at least 2 meters.

29. A method of making glass sheets comprising:
 (a) forming a glass ribbon having a width of at least 1500 millimeters using an isopipe according to claim 20; and
 (b) separating glass sheets from the glass ribbon;
wherein the glass making up the glass sheets comprises at least 5 weight percent alkali.

* * * * *